(12) United States Patent
Biadsy et al.

(10) Patent No.: US 9,412,365 B2
(45) Date of Patent: Aug. 9, 2016

(54) ENHANCED MAXIMUM ENTROPY MODELS

(71) Applicant: Google Inc., Mountain View, CA (US)

(72) Inventors: Fadi Biadsy, New York, NY (US); Brian E. Roark, Portland, OR (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/667,518

(22) Filed: Mar. 24, 2015

(65) Prior Publication Data

US 2015/0269934 A1    Sep. 24, 2015

Related U.S. Application Data

(60) Provisional application No. 61/969,625, filed on Mar. 24, 2014.

(51) Int. Cl.

| | | |
|---|---|---|
| *G10L 15/26* | (2006.01) |
| *G10L 15/16* | (2006.01) |
| *G10L 15/00* | (2013.01) |
| *G10L 15/06* | (2013.01) |
| *G10L 15/18* | (2013.01) |
| *G10L 15/197* | (2013.01) |

(52) U.S. Cl.
CPC .................................. *G10L 15/197* (2013.01)

(58) Field of Classification Search
None
See application file for complete search history.

(56) References Cited

U.S. PATENT DOCUMENTS

| | | | |
|---|---|---|---|
| 4,820,059 A | 4/1989 | Miller et al. |
| 5,267,345 A | 11/1993 | Brown et al. |
| 5,632,002 A | 5/1997 | Hashimoto et al. |
| 5,638,487 A | 6/1997 | Chigier |
| 5,715,367 A | 2/1998 | Gillick et al. |
| 5,737,724 A | 4/1998 | Atal et al. |
| 5,768,603 A | 6/1998 | Brown et al. |
| 5,805,832 A | 9/1998 | Brown et al. |
| 5,822,729 A * | 10/1998 | Glass .................. G10L 15/04 704/240 |
| 5,822,730 A | 10/1998 | Roth et al. |

(Continued)

FOREIGN PATENT DOCUMENTS

| | | |
|---|---|---|
| DE | 10045020 | 5/2001 |
| EP | 2383663 | 9/2005 |

(Continued)

OTHER PUBLICATIONS

Allauzen and Riley, "Bayesian language model interpolation for mobile speech input," In Interspeech, 2011, pp. 1429-1432.

(Continued)

*Primary Examiner* — Satwant Singh
(74) *Attorney, Agent, or Firm* — Fish & Richardson P.C.

(57) ABSTRACT

Methods, systems, and apparatus, including computer programs encoded on a computer storage medium, relating to enhanced maximum entropy models. In some implementations, data indicating a candidate transcription for an utterance and a particular context for the utterance are received. A maximum entropy language model is obtained. Feature values are determined for n-gram features and backoff features of the maximum entropy language model. The feature values are input to the maximum entropy language model, and an output is received from the maximum entropy language model. A transcription for the utterance is selected from among a plurality of candidate transcriptions based on the output from the maximum entropy language model. The selected transcription is provided to a client device.

20 Claims, 5 Drawing Sheets

(56) References Cited

U.S. PATENT DOCUMENTS

| | | |
|---|---|---|
| 6,021,403 A | 2/2000 | Horvitz et al. |
| 6,119,186 A | 9/2000 | Watts et al. |
| 6,167,377 A | 12/2000 | Gillick et al. |
| 6,182,038 B1 | 1/2001 | Balakrishnan et al. |
| 6,317,712 B1 | 11/2001 | Kao et al. |
| 6,397,180 B1 | 5/2002 | Jaramillo et al. |
| 6,418,431 B1 | 7/2002 | Mahajan et al. |
| 6,446,041 B1 | 9/2002 | Reynar et al. |
| 6,539,358 B1 | 3/2003 | Coon et al. |
| 6,581,033 B1 | 6/2003 | Reynar et al. |
| 6,678,415 B1 | 1/2004 | Popat et al. |
| 6,714,778 B2 | 3/2004 | Nykänen et al. |
| 6,754,626 B2 * | 6/2004 | Epstein .................. G10L 15/197 704/235 |
| 6,778,959 B1 | 8/2004 | Wu et al. |
| 6,839,670 B1 | 1/2005 | Stammler et al. |
| 6,876,966 B1 | 4/2005 | Deng et al. |
| 6,912,499 B1 | 6/2005 | Sabourin et al. |
| 6,922,669 B2 | 7/2005 | Schalk et al. |
| 6,950,796 B2 | 9/2005 | Ma et al. |
| 6,959,276 B2 | 10/2005 | Droppo et al. |
| 7,027,987 B1 | 4/2006 | Franz et al. |
| 7,043,422 B2 | 5/2006 | Gao et al. |
| 7,149,688 B2 | 12/2006 | Schalkwyk |
| 7,149,970 B1 | 12/2006 | Pratley et al. |
| 7,174,288 B2 | 2/2007 | Ju et al. |
| 7,200,550 B2 | 4/2007 | Menezes et al. |
| 7,257,532 B2 | 8/2007 | Toyama |
| 7,310,601 B2 | 12/2007 | Nishizaki et al. |
| 7,366,668 B1 | 4/2008 | Franz et al. |
| 7,370,275 B2 | 5/2008 | Haluptzok et al. |
| 7,383,553 B2 | 6/2008 | Atkin et al. |
| 7,392,188 B2 | 6/2008 | Junkawitsch et al. |
| 7,403,888 B1 | 7/2008 | Wang et al. |
| 7,424,426 B2 | 9/2008 | Furui et al. |
| 7,424,428 B2 | 9/2008 | Rose et al. |
| 7,451,085 B2 | 11/2008 | Rose et al. |
| 7,505,894 B2 | 3/2009 | Menezes et al. |
| 7,526,431 B2 | 4/2009 | Roth et al. |
| 7,577,562 B2 | 8/2009 | Menezes et al. |
| 7,599,893 B2 | 10/2009 | Sapir et al. |
| 7,634,720 B2 | 12/2009 | Haluptzok et al. |
| 7,672,833 B2 | 3/2010 | Blume et al. |
| 7,698,124 B2 | 4/2010 | Menezes et al. |
| 7,698,136 B1 | 4/2010 | Nguyen et al. |
| 7,752,046 B2 | 7/2010 | Bacchiani et al. |
| 7,778,816 B2 | 8/2010 | Reynar |
| 7,805,299 B2 | 9/2010 | Coifman |
| 7,831,427 B2 | 11/2010 | Potter et al. |
| 7,848,927 B2 | 12/2010 | Ohno et al. |
| 7,881,936 B2 | 2/2011 | Longé et al. |
| 7,890,326 B2 | 2/2011 | Strope et al. |
| 7,907,705 B1 | 3/2011 | Huff et al. |
| 7,941,189 B2 | 5/2011 | Miyauchi |
| 7,953,692 B2 | 5/2011 | Bower et al. |
| 7,996,220 B2 | 8/2011 | Rose et al. |
| 8,001,130 B2 | 8/2011 | Wen et al. |
| 8,005,680 B2 | 8/2011 | Kommer |
| 8,009,678 B2 | 8/2011 | Brooke |
| 8,027,973 B2 | 9/2011 | Cao et al. |
| 8,060,373 B2 | 11/2011 | Gibbon et al. |
| 8,069,027 B2 | 11/2011 | Liu et al. |
| 8,069,043 B2 | 11/2011 | Bacchiani et al. |
| 8,296,142 B2 | 10/2012 | Lloyd et al. |
| 8,352,245 B1 | 1/2013 | Lloyd |
| 8,352,246 B1 | 1/2013 | Lloyd |
| 8,473,289 B2 | 6/2013 | Jitkoff et al. |
| 8,521,526 B1 | 8/2013 | Lloyd et al. |
| 8,532,994 B2 | 9/2013 | Malegaonkar et al. |
| 8,583,416 B2 | 11/2013 | Huang et al. |
| 8,798,984 B2 | 8/2014 | Cancedda et al. |
| 8,862,468 B2 * | 10/2014 | Paek .................. G06F 17/271 704/243 |
| 9,110,880 B1 * | 8/2015 | Strope .................. G10L 15/183 |
| 2002/0062216 A1 | 5/2002 | Guenther et al. |
| 2002/0078091 A1 | 6/2002 | Vu et al. |
| 2002/0087309 A1 | 7/2002 | Lee et al. |
| 2002/0087314 A1 | 7/2002 | Fischer et al. |
| 2002/0111990 A1 | 8/2002 | Wood et al. |
| 2002/0165714 A1 | 11/2002 | Beyerlein |
| 2003/0050778 A1 | 3/2003 | Nguyen et al. |
| 2003/0149561 A1 | 8/2003 | Zhou |
| 2003/0216919 A1 | 11/2003 | Roushar |
| 2003/0236099 A1 | 12/2003 | Deisher et al. |
| 2004/0024583 A1 | 2/2004 | Freeman |
| 2004/0043758 A1 | 3/2004 | Sorvari et al. |
| 2004/0049388 A1 | 3/2004 | Roth et al. |
| 2004/0098571 A1 | 5/2004 | Falcon |
| 2004/0138882 A1 | 7/2004 | Miyazawa |
| 2004/0172258 A1 | 9/2004 | Dominach et al. |
| 2004/0230420 A1 | 11/2004 | Kadambe et al. |
| 2004/0243415 A1 | 12/2004 | Commarford et al. |
| 2005/0005240 A1 | 1/2005 | Reynar et al. |
| 2005/0108017 A1 | 5/2005 | Esser et al. |
| 2005/0114474 A1 | 5/2005 | Anderson et al. |
| 2005/0187763 A1 | 8/2005 | Arun |
| 2005/0193144 A1 | 9/2005 | Hassan et al. |
| 2005/0216273 A1 | 9/2005 | Reding et al. |
| 2005/0246325 A1 | 11/2005 | Pettinati et al. |
| 2005/0283364 A1 | 12/2005 | Longe et al. |
| 2006/0004572 A1 | 1/2006 | Ju et al. |
| 2006/0004850 A1 | 1/2006 | Chowdhury |
| 2006/0009974 A1 | 1/2006 | Junqua et al. |
| 2006/0035632 A1 | 2/2006 | Sorvari et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0212288 A1 | 9/2006 | Sethy et al. |
| 2006/0247915 A1 | 11/2006 | Bradford et al. |
| 2007/0060114 A1 | 3/2007 | Ramer et al. |
| 2007/0078653 A1 * | 4/2007 | Olsen .................. G10L 15/197 704/240 |
| 2007/0174040 A1 | 7/2007 | Liu et al. |
| 2008/0027723 A1 | 1/2008 | Reding et al. |
| 2008/0091406 A1 | 4/2008 | Baldwin et al. |
| 2008/0091435 A1 | 4/2008 | Strope et al. |
| 2008/0091443 A1 | 4/2008 | Strope et al. |
| 2008/0131851 A1 | 6/2008 | Kanevsky et al. |
| 2008/0133228 A1 | 6/2008 | Rao |
| 2008/0162117 A1 | 7/2008 | Bangalore et al. |
| 2008/0188271 A1 | 8/2008 | Miyauchi |
| 2008/0221887 A1 | 9/2008 | Rose et al. |
| 2008/0221902 A1 | 9/2008 | Cerra et al. |
| 2008/0243481 A1 | 10/2008 | Brants et al. |
| 2008/0301112 A1 | 12/2008 | Wu |
| 2009/0030687 A1 | 1/2009 | Cerra et al. |
| 2009/0030696 A1 * | 1/2009 | Cerra .................. G10L 15/30 704/275 |
| 2009/0083023 A1 | 3/2009 | Foster et al. |
| 2009/0150160 A1 | 6/2009 | Mozer |
| 2009/0164216 A1 | 6/2009 | Chengalvarayan et al. |
| 2009/0210214 A1 | 8/2009 | Qian et al. |
| 2009/0271177 A1 | 10/2009 | Menezes et al. |
| 2009/0271188 A1 | 10/2009 | Agapi et al. |
| 2009/0287681 A1 | 11/2009 | Paek et al. |
| 2009/0292529 A1 | 11/2009 | Bangalore et al. |
| 2010/0004930 A1 | 1/2010 | Strope et al. |
| 2010/0049502 A1 | 2/2010 | Oppenheim et al. |
| 2010/0088303 A1 | 4/2010 | Chen et al. |
| 2010/0100377 A1 | 4/2010 | Madhavapeddi et al. |
| 2010/0153219 A1 | 6/2010 | Mei et al. |
| 2010/0169094 A1 * | 7/2010 | Akamine .................. G10L 15/144 704/244 |
| 2010/0179803 A1 | 7/2010 | Sawaf et al. |
| 2010/0191685 A1 | 7/2010 | Sapir et al. |
| 2010/0254521 A1 | 10/2010 | Kriese et al. |
| 2010/0318531 A1 | 12/2010 | Gao et al. |
| 2010/0325109 A1 | 12/2010 | Bai et al. |
| 2011/0004462 A1 | 1/2011 | Houghton et al. |
| 2011/0066577 A1 | 3/2011 | Van Gael et al. |
| 2011/0077943 A1 | 3/2011 | Miki et al. |
| 2011/0093265 A1 | 4/2011 | Stent et al. |
| 2011/0137653 A1 | 6/2011 | Ljolje et al. |

(56) References Cited

U.S. PATENT DOCUMENTS

| | | | |
|---|---|---|---|
| 2011/0144992 A1 | 6/2011 | Toutanova et al. | |
| 2011/0162035 A1 | 6/2011 | King et al. | |
| 2011/0224982 A1* | 9/2011 | Acero | G10L 15/08 704/236 |
| 2011/0231183 A1 | 9/2011 | Yamamoto et al. | |
| 2011/0257974 A1 | 10/2011 | Kristjansson et al. | |
| 2011/0288868 A1 | 11/2011 | Lloyd et al. | |
| 2011/0295590 A1 | 12/2011 | Lloyd et al. | |
| 2012/0084235 A1 | 4/2012 | Suzuki et al. | |
| 2012/0316862 A1 | 12/2012 | Sultan et al. | |
| 2012/0316877 A1 | 12/2012 | Zweig et al. | |
| 2013/0046619 A1* | 2/2013 | Translateur | G06Q 30/02 705/14.46 |
| 2013/0110491 A1 | 5/2013 | He et al. | |
| 2013/0346059 A1 | 12/2013 | Brants et al. | |
| 2014/0200878 A1 | 7/2014 | Mylonakis et al. | |
| 2014/0244248 A1* | 8/2014 | Arisoy | G10L 15/197 704/232 |
| 2014/0244261 A1* | 8/2014 | Arisoy | G10L 15/197 704/257 |
| 2015/0228279 A1* | 8/2015 | Biadsy | G10L 15/26 704/235 |
| 2015/0332670 A1* | 11/2015 | Akbacak | G10L 15/063 704/9 |

FOREIGN PATENT DOCUMENTS

| | | |
|---|---|---|
| WO | 9931654 | 6/1999 |
| WO | 02073331 | 9/2002 |
| WO | 02096070 | 11/2002 |
| WO | 2010085773 | 7/2010 |
| WO | 2012170817 | 12/2012 |
| WO | 2013083132 | 6/2013 |
| WO | 2013192218 | 12/2013 |

OTHER PUBLICATIONS

Alumae and Kurimo, "Efficient estimation of maximum entropy language models with N-gram features: an SRILM extension," in Interspeech, 2010, pp. 1820-1823.
Biadsy et al., "Backoff Inspired Features for Maximum Entropy Language Models", Proceedings of Interspeech, 2014, 5 pages.
Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.
Brants et al., "Large language models in machine translation," in In Proceedings of the Joint Conference on Empirical Methods in Natural Language Processing and Computational Natural Language Learning, pp. 858-867, Jun. 2007.
Chen "Performance Prediction for Exponential Language Models", Technical Report RC 24671, IBM Research Division, 2008, 53 pages.
Chen and Rosenfeld, "A survey of smoothing techniques for ME models," IEEE Transactions on Speech and Audio Processing, vol. 8, issue 1, pp. 37-50, Jan. 2000.
Collins, "Log-Linear Models," retrieved on Jul. 21, 2015. Retrieved from the internet: URL<http://www.cs.columbia.edu/~mcollins/loglinear.pdf> 20 pages.
Della et al., "Adaptive Language Modeling Using Minimum Discriminant Estimation", paper submitted to the ICASSP92 Proceedings, 1992, 4 pages.
Dhillon. 2001. Co-clustering documents and words using bipartite spectral graph partitioning. In: Proceedings of the seventh ACM SIGKDD international conference on Knowledge discovery and data mining, (KDD '01). ACM, New York, NY, USA, 269-274. http://doi.acm.org/10.1145/502512.502550.
Frey et al., "ALGONQUIN: Iterating Laplace's Method to Remove Multiple Types of Acoustic Distortion for Robust Speech Recognition", EUROSPEECH 2001 Scandinavia, 7th European Conference on Speech Communication and Technology, Aalborg, Denmark, Sep. 3-7, 2001, [online] research.microsoft.com [retrieved on Nov. 23, 2010]. Retrieved from the Internet: <URL: http://research.microsoft.com/pubs/76516/2001-frey-eurospeech.pdf>. 4 pages.
Hall et al., "MapReduce/Bigtable for distributed optimization," in Neural Information Processing Systems Workshop on Leaning on Cores, Clusters, and Clouds, 2010, pp. 1-7.
Katz, "Estimation of probabilities from sparse data for the language model component of a speech recognizer," IEEE Transactions on Acoustics, Speech, and Signal Processing, vol. 35, No. 3, pp. 400-401, Mar. 1987.
Kristjansson et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.
Lau et al., "Trigger-based language models: a maximum entropy approach," in Proceedings of the International Conference on Acoustics, Speech, and Signal Processing (ICASSP), Apr. 1993, pp. 45-48.
Lee et al. Search Result Clustering Using Label Language Model. IJCNLP 2008, The Third International Joint Conference on Natural Language Processing. Jan. 7-12, 2008, Hyderabad, India.
Liu and Croft, "Cluster-based retrieval using language models," In: Proceedings of the 27th annual international ACM SIGIR conference on Research and development in information retrieval, (SIGIR '04), 2004, ACM, New York, NY, USA, 186-193. http://doi.acm.org/10.1145/1008992.1009026.
McDonald et al., "Distributed training strategies for the structured perceptron," in Human Language Technologies: The 2010 Annual Conference of the North American Chapter of the Association for Computational Linguistics, Jun. 2010, pp. 456-464.
Mohri et al. Weighted Finite-State Transducers in Speech Recognition, Computer Speech & Language, vol. 16, Issue 1, Jan. 2002, pp. 69-88.
Niu et al., "Hogwild!: A lock-free approach to parallelizing stochastic gradient descent," in Advances in Neural Information Processing Systems 24, 2011, 9 pages.
Roark et al., "Discriminative n-gram language modeling," Computer Speech &: Language, vol. 21, No. 2, pp. 373-392, Apr. 2007.
Rosenfeld et al., "Whole-sentence exponential language models: a vehicle for linguistic-statistical integration," Computer Speech and Language, vol. 15, No. 1, pp. 55-73, Jan. 2001.
Rosenfeld, "A maximum entropy approach to adaptive statistical language modeling," Computer Speech and Language, vol. 10, pp. 187-228, May 1996.
Rosenfeld, "A whole sentence maximum entropy language model," in Proceedings of IEEE Workshop on Speech Recognition and Understanding, Dec. 1997, pp. 230-237.
Sarikaya et al., "Joint Morphological-Lexical Language Modeling for Processing Morphologically Rich Languages With Application to Dialectal Arabic," Audio, Speech, and Language Processing, IEEE Transactions on, vol. 16, No. 7, pp. 1330-1339, Sep. 2008.
Schalkwyk et al., "your word is my command: Google search by voice: A case study," in Advances in Speech Recognition. Springer, Aug. 2010, pp. 61-90.
Shaik et al., "Feature-rich sub-lexical language models using a maximum entropy approach for German LVCSR," in Interspeech, 2013, pp. 3404-3408.
Tsitsiklis et al., "Distributed asynchronous deterministic and stochastic gradient optimization algorithms," IEEE Transactions on Automatic Control, 31(9):803-812, Sep. 1986.
Tsuruoka et al., "Stochastic gradient descent training for l1-regularized log-linear models with cumulative penalty," in Proceedings of the Joint Conference of the 47th Annual Meeting of the ACL, Aug. 2009, pp. 477-485.
Vertanen, "An Overview of Discriminative Training for Speech Recognition," Technical Report, 2004, from http://www.inference.phy.cam.ac.uk/kv227/papers/Discriminative_Training.pdf., 14 pages.
Wikipedia.com, "Gradient descent," Jan. 7, 2014 [retrieved on Feb. 10, 2014]. Retrieved from the Internet: URL< http://en.wikipedia.org/wiki/Gradient_descent>. 8 pages.
Wikipedia.com, "Language Model," Dec. 22, 2013, [retrieved on Feb. 10, 2014]. Retrieved from the internet: URL< http://en.wikipedia.org/wiki/Language_model>. 3 pages.

(56) References Cited

OTHER PUBLICATIONS

Wikipedia.com, "Log-linear model," Apr. 6, 2013 [retrieved on Feb. 10, 2014]. Retrieved from the Internet: URL< http://en.wikipedia.org/wiki/Log-linear_model>. 1 page.

Wu and Khudanpur, "Building a topic-dependent maximum entropy model for very large corpora," in Acoustics, Speech, and Signal Processing (ICASSP), 2002 IEEE International Conference on, vol. 1. IEEE, May 2002, pp. I-777-I-780.

Wu and Khudanpur, "Efficient training methods for maximum entropy language modeling," in INTERSPEECH, 2000, pp. 114-118.

Wu, "Maximum Entropy Language Modeling with Non-Local Dependencies", dissertation submitted to the Johns Hopkins University in conformity with the requirements for the degree of Doctor of Philosophy, Baltimore, Maryland, 2002, 227 pages.

Xu et al. 2007. Using social annotations to improve language model for information retrieval. In: Proceedings of the sixteenth ACM conference on Conference on information and knowledge management, (CIKM '07). ACM, New York, NY, USA, 1003-1006. http://doi.acm.org/10.1145.

Xu et al., "Efficient subsampling for training complex language models," in Proceedings of the Conference on Empirical Methods in Natural Language Processing. Association for Computational Linguistics, 2011, pp. 1128-1136.

Zha et al. Bipartite graph partitioning and data clustering. In Proceedings of the tenth international conference on Information and knowledge management (CIKM '01), Henrique Paques, Ling Liu, and David Grossman (Eds.). 2001, ACM, New York, NY, USA, 25-32.

Zinkevich et al., "Parallelized stochastic gradient descent," in Advances in Neural Information Processing Systems 23, J. Lafferty, C. K. I. Williams, J. Shawe-Taylor, R Zemel, and A. Culotta, Eds., 2010, pp. 2595-2603.

Zweig et al., "Structured Models for Joint Decoding of Repeated Utterances", INTERSPEECH 2008, 9th Annual Conference of the International Speech Communication Association, Brisbane, Australia, Sep. 22-26, 2008, 4 pages.

Zweig, "New Methods for the Analysis of Repeated Utterances", INTERSPEECH 2009, 10th Annual Conference of the International Speech Communication Association, Brighton, United Kingdom, Sep. 6-10, 2009, 4 pages.

\* cited by examiner

ENHANCED MAXIMUM ENTROPY MODELS

CROSS-REFERENCE TO RELATED APPLICATIONS

This application claims priority to U.S. Provisional Patent Application Ser. No. 61/969,625, filed Mar. 24, 2014, which is hereby incorporated by reference in its entirety.

BACKGROUND

This specification relates to enhanced maximum entropy models.

SUMMARY

Maximum entropy models, including log-linear models, may be enhanced by the inclusion of additional features, for example, backoff features, penalty features, or features corresponding to contexts not observed during training.

In one general aspect, a method performed by one or more computers includes: receiving data indicating a candidate transcription for an utterance and a particular context for the utterance; obtaining a maximum entropy language model that includes (i) scores for one or more n-gram features that each correspond to a respective n-gram and (ii) scores for one or more backoff features that each correspond to a set of n-grams for which there are no corresponding n-gram features in the maximum entropy language model; determining, based on the candidate transcription and the particular context, a feature value for (i) each of the one or more n-gram features of the maximum entropy language model and (ii) each of the one or more backoff features of the maximum entropy language model; inputting the feature values for the n-gram features and the feature values for the backoff features to the maximum entropy language model; and receiving, from the maximum entropy language model, an output indicative of a likelihood of occurrence of the candidate transcription; selecting, based on the output of the maximum entropy language model, a transcription for the utterance from among a plurality of candidate transcriptions; and providing the selected transcription to a client device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, the maximum entropy language model is a log-linear model. The scores of the maximum entropy language model include, for each context in a set of different contexts that each include a different sequence of one or more words, scores for: multiple different n-gram features that each correspond to the occurrence of a respective word with the context, and a backoff feature that corresponds to the occurrence of any of multiple words with the context. The scores of the maximum entropy language model include, for each context in a set of different contexts that each include a different sequence of one or more words, scores for: multiple different n-gram features that each correspond to the occurrence of a respective word with the context, the respective words forming a set of words, and a backoff feature that corresponds to the occurrence, with the context, of any word that is not in the set of words. The multiple different n-gram features for a context each correspond to the occurrence of a respective word after the one or more words of the context, and the backoff feature for the context corresponds to the occurrence of any of multiple words after the one or more words of the context.

Implementations may include one or more of the following features. For example, the scores of the maximum entropy language model include, for each context in a set of different contexts that each include a different sequence of one or more words, respective scores for: multiple different n-gram features that each correspond to a respective language sequence that includes the one or more words of the context, each of the respective language sequences being formed of a same, particular number of words, and one or more backoff features that each correspond to a set of multiple language sequences, where, for each backoff feature, each language sequence in the set of language sequences (i) is formed of the particular number of words, (ii) includes a particular subset of the one or more words of the context, and (iii) omits a particular subsequence of words within the context. The one or more backoff features for a context include multiple backoff features that correspond to different sets of language sequences that include different portions of the context. Generating the second set of feature values for the one or more backoff features based on the particular context includes generating at least one feature value that indicates that at least a portion of the particular context does not correspond to any of the n-gram features. Determining the feature values includes: identifying a particular n-gram that includes words of the candidate transcription immediately following a sequence of words indicated by the particular context, the n-gram of words being formed of a particular number of words; determining that that the maximum entropy language model does not have an n-gram feature corresponding to the particular n-gram; in response to determining that the maximum entropy language model does not have an n-gram feature corresponding to the particular n-gram: determining first feature values that indicate the non-occurrence of n-grams having the particular number of words that have corresponding n-gram features in the maximum entropy language model; determining, for at least one backoff feature, a second feature value that indicates the occurrence of a language sequence that (i) has the particular number of words and (ii) includes a specific portion of the particular context. Determining the feature values includes determining multiple second feature values that each indicate the occurrence of an n-gram having the particular number of words, the multiple second feature values corresponding to different backoff features and indicating that different portions of the particular context occurred within an n-gram having the particular number of words. The feature values for the n-gram features indicate whether a particular n-gram including the candidate transcription and the particular context matches n-grams associated with the respective n-gram features, and where the feature values for the backoff features indicate whether the portions of the particular n-gram are different from the n-grams associated with the respective n-gram features. At least one of the feature values for the backoff features indicates that a portion of the particular context having particular size is different from the each of the contexts of the particular size that are associated with the n-gram features. Each of the feature values is a binary value. Scores for at least some of the backoff features of the maximum entropy language model indicate a non-zero probability of occurrence of sets of n-grams represented by the backoff features, and where the maximum entropy language model is normalized.

In another general aspect, a method includes: identifying n-grams based on a set of training data; determining n-gram features corresponding to the identified n-grams; determining one or more backoff features corresponding to n-grams that are not included in the identified n-grams; and training a maximum entropy model using feature values for the n-gram features and feature values for the one or more backoff features.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. Implementations may include one or more of the following features. For example, training the maximum entropy model using feature values for the n-gram features and feature values for the one or more backoff features comprises training a log-linear model using the feature values for the n-gram features and feature values for the one or more backoff features. The feature values for the n-gram features indicate whether an n-gram occurs that is one of the n-grams corresponding to the n-gram features. The feature values for the one or more backoff features indicate whether an n-gram occurs that is not one of the n-grams corresponding to the n-gram features. The feature values for the context features and the feature values for the one or more backoff features are binary values. Training the maximum entropy model using feature values for the n-gram features and feature values for the one or more backoff features comprises training the maximum entropy model using a stochastic gradient descent algorithm. Training the maximum entropy model using feature values for the n-gram features and feature values for the one or more backoff features comprises distributing training tasks across a plurality of computing devices. Training the maximum entropy model using feature values for the n-gram features and feature values for the one or more backoff features comprises training the maximum entropy model using MapReduce processing framework. Identifying the n-grams based on the set of training data comprises identifying n-grams in the training data. Identifying the n-grams based on the set of training data comprises identifying n-grams of terms that occur in the training data with at least a predetermined minimum frequency. Identifying the n-grams based on the set of training data comprises identifying n-grams that each occur multiple times in the training data. Determining the n-gram features corresponding to the identified n-grams comprises determining n-gram features that each correspond to a particular n-gram identified in the training data; and determining the one or more backoff features corresponding to n-grams that are not included in the identified n-grams comprises determining one or more features that each represent n-grams that are different from the identified n-grams. Training the maximum entropy model using feature values for the n-gram features and feature values for the one or more backoff features comprises training a language model. The actions include using the trained maximum entropy model to obtain an output indicative of a likelihood of occurrence of a term after one or more previous terms. Training the maximum entropy model using feature values for the n-gram features and feature values for the one or more backoff features comprises assigning a weight to at least one backoff feature, wherein the weight reduces a likelihood of occurrence indicated by the maximum entropy model when the at least one backoff feature is activated.

In another general aspect, a method includes: receiving data indicating an n-gram; determining a first set of feature values for n-gram features based on the indicated n-gram; determining a second set of feature values for one or more backoff features based on the indicated n-gram; inputting the first set of feature values and the second set of feature values to a trained maximum entropy model; and receiving, from the trained maximum entropy model, an output indicative of a likelihood of occurrence of the n-gram or a portion of the n-gram given the remainder of the n-gram.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, generating the second set of feature values for the one or more backoff features based on the indicated n-gram comprises generating at least one feature value that indicates that at least a portion of the indicated n-gram does not correspond to any of the n-gram features. Inputting the first set of feature values and the second set of feature values to the trained maximum entropy model comprises inputting the first set of feature values and the second set of feature values to a model trained to decrease, in response to receiving at least one feature value that indicates that at least a portion of the indicated n-gram does not correspond to any of the n-gram features, a likelihood that the model estimates for the indicated n-gram. Receiving data indicating the n-gram comprises receiving data indicating a sequence of terms; generating the first set of feature values for the n-gram features based on the indicated n-gram comprises generating feature values for n-gram features based on the sequence of terms; generating the second set of feature values for the one or more backoff features based on the indicated n-gram comprises generating the second set of feature values for the one or more backoff features based on whether at least a portion of the sequence of terms is different from n-grams corresponding to the n-gram features; inputting the first set of feature values and the second set of feature values to the trained maximum entropy model comprises inputting the first set of feature values and the second set of feature values to a trained language model; and receiving, from the trained maximum entropy model, an output indicative of a likelihood of occurrence of an outcome given a context comprises receiving, from the trained language model, an output indicative of a likelihood that a particular term occurs after other terms in the sequence of terms. The maximum entropy model is a log-linear model. The maximum entropy model is a language model. The feature values for the first set of feature values indicate whether the indicated n-gram matches n-grams associated with the respective n-gram features. The feature values in the second set of feature values indicate whether the at least a portion of the indicated n-gram differs from the n-grams associated with the respective n-gram features. At least one of the feature values in the second set of feature values represents that a portion of the indicated n-gram having particular size is different from the n-grams of the particular size that are associated with the n-gram features. The feature values in the first set of feature values and the feature values in the second set of feature values are binary values. Inputting the first set of feature values and the second set of feature values to the trained maximum entropy model comprises inputting the first set of feature values and the second set of feature values to a trained maximum entropy model comprising a weight assigned to at least one backoff feature, wherein the weight reduces a likelihood of occurrence indicated by the trained maximum entropy model when the at least one backoff feature is activated.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
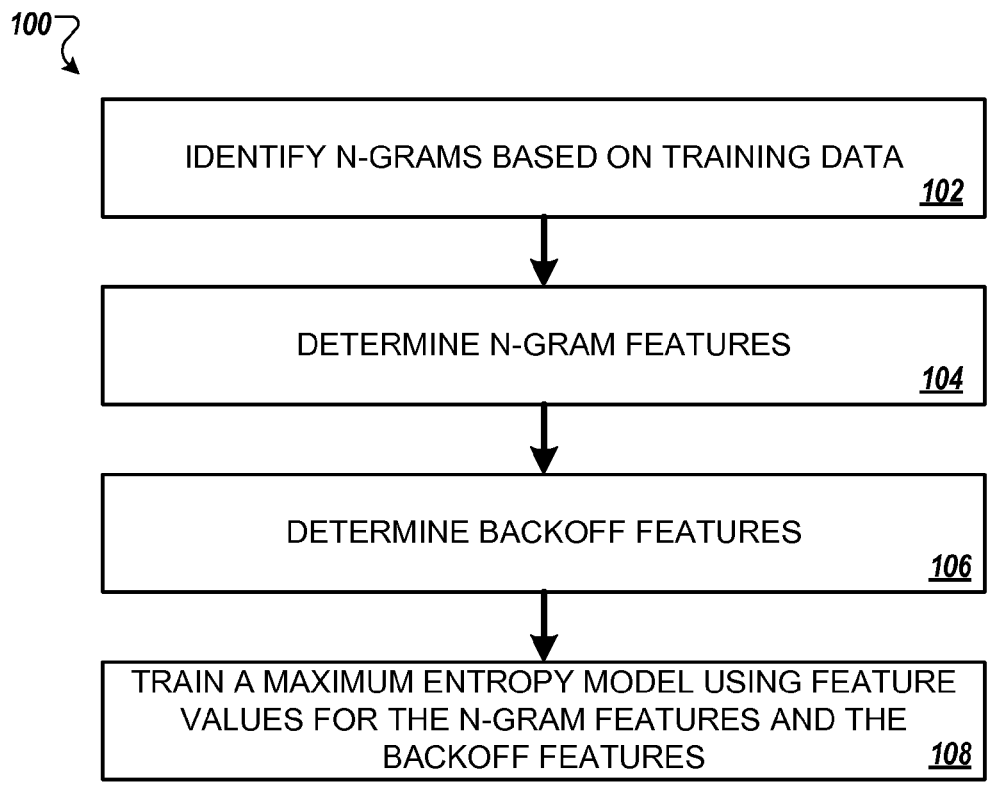
FIG. 1 is a flow diagram that illustrates an example of a method for training an enhanced maximum entropy model.

One challenge in language modeling and other uses of maximum entropy models is how to combine information from various model components, e.g., mixing models trained with differing Markov orders for smoothing or on distinct corpora for adaptation. Smoothing (regularization) for n-gram language models is typically presented as a mechanism whereby higher-order models are combined with lower-order models so as to achieve both the specificity of the higher-order model and the more robust generality of the lower-order model. Commonly, this combination is effected via an interpolation or backoff mechanism, in which each prefix (history) of an n-gram has a parameter which dictates how much cost is associated with making use of lower-order n-gram estimates, often called the "backoff cost." This becomes a parameter estimation problem in its own right, either through discounting or mixing parameters; and these are often estimated via extensive parameter tying, heuristics based on count histograms, or both.

Log-linear models provide an alternative to n-gram backoff or interpolated models for combining evidence from multiple, overlapping sources of evidence, with very different regularization methods. Instead of defining a specific model structure with backoff costs and/or mixing parameters, these models may combine features from many sources into a single linear feature vector, and score a word by taking the dot product of the feature vector with a learned parameter vector. Learning can be performed via locally normalized likelihood objective functions, as in Maximum Entropy (MaxEnt) models or global "whole sentence" objectives. For locally normalized MaxEnt models, which estimate a conditional distribution over a vocabulary given the prefix history (just as the backoff smoothed n-gram models do), the brute-force local normalization over the vocabulary obviates the need for complex backoff schemes to avoid zero probabilities. One can simply include n-gram features of all the orders, and learn their relative contribution.

However, backoff n-gram models typically do not include only parameters associated with n-grams; they also include parameters associated with the backoff weights for each prefix history. For every proper prefix of an n-gram in the model, there may be an associated backoff weight, which penalizes to a greater or lesser extent words that have been previously unseen following that prefix history. For some histories, the model should have a relatively high expectation of seeing something new, either because the history itself is rare (hence we do not have enough observations yet to be strongly predictive) or it simply predicts relatively open classes of possible words, e.g., "the", which can precede many possible words, including many that were presumably unobserved following "the" in the training corpus. Other prefixes may be highly predictive so that the expectation of seeing something previously unobserved is relatively low.

MaxEnt language models (LMs) typically do not need this information about prefix histories to estimate regularized probabilities. Various smoothing and regularization methods for MaxEnt language models may be used, including: (i) reducing the number of features (as L1 regularization does), (ii) optimizing to match expected frequencies to discounted counts, and/or (iii) optimizing to modified objectives, such as L2 regularization. These methods generally do not involve model parameters with the sort of "otherwise" semantics of n-gram backoffs. Because such features are generally not required for smoothing, they are not part of the typical feature set used in log-linear language modeling. Nevertheless, such features can be advantageously used to improve the effectiveness of a log-linear language model, as discussed further below.

In some instances, the usefulness of such features may depend on the amount of training data available. In large scale n-gram modeling, the specific details of the smoothing algorithm is typically less important than the scale. So-called "stupid backoff" is an efficient, scalable estimation method that, despite lack of normalization guarantees, is shown to be extremely effective in very large data set scenarios. While this has been taken to demonstrate that the specifics of smoothing is unimportant as the data gets large, those parameters are still important components of the modeling approach, even if their usefulness is robust to variation in parameter value.

As discussed further below, features patterned after backoff weights, and several related generalizations of these features, can in fact make a large difference to a MaxEnt or log-linear language model, even if the amount of training data is very large.

An example of a backoff language model formulation is now described. Let $w_i$ be the word at position i in a string, and let $w_{i-k}^{i-1} = w_{i-k} \ldots w_{i-1}$ be the prefix history of the string prior to $w_i$, and let $\overline{P}$ be a probability estimate assigned to observed n-grams by the specific smoothing method. The language model can be defined according to Equation (1), below:

$$P(w_i \mid w_{i-k}^{j-1}) = \begin{cases} \overline{P}(w_i \mid w_{i-k}^{j-1}) & \text{if } c(w_{i-k}^{j}) > 0 \\ \alpha(w_{i-k}^{j-1}) P(w_i \mid w_{i-k+1}^{j-1}) & \text{otherwise} \end{cases} \quad (1)$$

This recursive smoothing formulation has two kinds of parameters: n-gram probabilities $P(w_i|w_{i-k}^{i-1})$ and backoff weights $\alpha(w_{i-k}^{i-1})$, which are parameters associated with the prefix history $w_{i-k}^{i-1}$.

MaxEnt models are typically log-linear models that score alternatives by taking the exponential of the dot product between a feature vector and a parameter vector, and then normalize the score. Let $\Phi(w_{i-k} \ldots w_i)$ be a d-dimensional feature vector, $\theta$ a d-dimensional parameter vector, and V a vocabulary. Then the model may be formulated according to Equation (2), below:

$$P(w_i \mid w_{i-k}^{j-1}) = \frac{\exp(\Phi(w_{i-k} \ldots w_i) \cdot \theta)}{Z(w_{i-k} \ldots w_{i-1}, \theta)} \quad (2)$$

where Z is a partition function (normalization constant) given by Equation (3), below:

$$Z(w_{i-k}, \ldots, w_{i-1}, \theta) = \sum_{v \in V} \exp(\Phi(w_{i-k}, \ldots, w_{i-1} v) \cdot \theta) \quad (3)$$

Training with a likelihood objective function is a convex optimization problem, and so any of various efficient estimation techniques may be used for training, such as stochastic gradient descent. Any of a variety of regularization techniques may be used, and include L1 and L2 regularization, or their combination, which are modifications of the likelihood objective to either keep parameter values as close to zero as possible (L2) or reduce the number of features with non-zero parameter weights by pushing many parameters to zero (L1). A combination of L1 and L2 may be employed.

The most expensive part of this optimization is the calculation of the partition function, since it typically involves summing over the entire vocabulary, which can be very large. Efficient methods to enable training with very large corpora and large vocabularies may be used, from methods to exploit structural overlap between features to methods for decomposing the multi-class language modeling problem into many binary language modeling problems (one versus the rest) and sampling less data to effectively train the models. Some implementations may use multiple of such optimizations to enable training with very large vocabularies, e.g., several hundred thousand words, and very large training sets, e.g., over a hundred billion words.

Many types of features may be used in MaxEnt language models, including features for n-grams and trigger words, topic-based features and morphological and sub-word based features. Feature engineering can be a major consideration in MaxEnt modeling, and the set of features selected can have a significant impact on the performance of a model. Before discussing particular features, it is worth noting examples of training methods that allow a model to scale up to a very large vocabulary and many training instances.

In some implementations, it may be desirable to scale up MaxEnt language model training to learn from the same or similar amounts of data used for standard backoff n-gram language models. This may be achieved, for example, using gradient-based distributed optimization, such as distributed stochastic gradient descent (SGD). Some implementations may use the MapReduce framework. Some innovative techniques that may be used include: (1) applying a final L1 regularization set at the end of each reducer using statistics collected from the mappers, and/or (2) estimating the gradient using a mini-batch of 16 using a pool of 16 threads. A larger or smaller batch size or thread pool size may be used.

A variant of the iterative parameter mixtures (IPM) algorithm based on sampling is presented below. Any appropriate distributed optimization framework may be used to train a MaxEnt model using the techniques described herein. An example using the MapReduce framework is shown in Algorithm 1, below:

---

Algorithm 1 Sample-based Iterative Parameter Mixtures

---

Require: n is the number of samples per worker per epoch
Require: Break S into K partitions
1:    $S \leftarrow \{D^1, \ldots, D^j, \ldots, D^K\}$
2:    $t \leftarrow 0$
3:    $\Theta_t \leftarrow 0$
4:    repeat
5:        $t \leftarrow t + 1$
6:        $\{\theta_t^1, \ldots, \theta_t^K\} \leftarrow \text{IPM}_{MAP}(D^1, \ldots, D^K, \Theta_{t-1}, n)$
7:        $\Theta'_t \leftarrow \text{IPM}_{REDUCE}(\theta_t^1, \ldots, \theta_t^j, \ldots, \theta_t^K)$
8:        $\Theta_t \leftarrow A_{PPLY}L1(\Theta'_t)$
9:    until converged
10:   function $\text{IPM}_{MAP}(D, \Theta, n)$
11:       ▷ $\text{IPM}_{MAP}$ processes training data in parallel
12:       $\Theta_0 \leftarrow \Theta$
13:       for i = 1 ... n do   ▷ n examples from D
14:           Sample $d_i$ from D
15:           $\Theta'_i \leftarrow \text{ApplyLazyL1}(\text{ActiveFeatures}(d_i, \Theta_{i-1}))$
16:           $\Theta_i \leftarrow \Theta'_i - \alpha \nabla F_{ddi\,i}(\Theta'_i)$
17:           $\alpha \leftarrow \text{UpdateAlpha}(\alpha, i)$
18:       end for
19:       return $\Theta_n$
20:   end function
21:   function $\text{IPM}_{REDUCE}(\theta_t^1, \ldots, \theta_t^j, \ldots, \theta_t^K)$
22:       ▷ $\text{IPM}_{REDUCE}$ processes model parameters in parallel
23:       $\theta_t \leftarrow \frac{1}{K} \sum_j \theta_t^j$
24:       return $\theta_t$
25:   end function

---

The techniques shown in Algorithm 1 represent a merger of concepts from the original IPM algorithm and a distributed sample-based algorithm, as well as lazy L1 SGD computation.

Although Algorithm 1 provides an example of a MapReduce implementation, other distributed optimization techniques may be used. We begin the process by partitioning the training data S into multiple units $D^i$, processing each of these units with the $\text{IPM}_{MAP}$ function on separate processing nodes. On each of these nodes, $\text{IPM}_{MAP}$ samples a subset of $D^i$ which we call $d_i$. This can be a single example or a mini-batch of examples. We perform the Lazy L1 regularization update to the model, compute the gradient of the regularized loss associated with the minibatch (which can be also be done in parallel), update the local copy of the model parameters $\theta$, and update the learning-rate $\alpha$. Each node samples n examples from its data partition. Finally, $\text{IPM}_{REDUCE}$ collects the local model parameters from each $\text{IPM}_{MAP}$ and averages them in parallel. Parallelization here can be done over subsets of the parameter indices (each $\text{IPM}_{REDUCE}$ node averages a subset of the parameter space). We refer to each full MapReduce pass as an "epoch" of training. Starting with the second epoch, the IPMMAP nodes are initialized with the previous epoch's merged, regularized model.

In a general shared distributed framework, some machines may be slower than others (due to hardware or overload), machines may fail, or jobs may be preempted. To avoid starting the training process over in these cases, and make all others wait for the lagging machines, we enforce a timeout on our trainers. In other words, all mappers have to finish within a certain amount of time. Therefore, the reducer will merge all models when they have either finished processing their samples or timed-out.

MaxEnt language models may have n-gram features, which we denote here as a function of the string $w_1 \ldots w_n$, the position i, and the order k as shown in Equation (4), below:

$$NGram(w_1 \ldots w_n, i, k) = <w_{i-k}, \ldots w_{i-1}, w_i> \quad (4)$$

We now introduce some features inspired by the backoff parameters $\alpha(w_{i-k}^{i-1})$ discussed above. The most directly related features are termed "suffix backoff" features, and are denoted as shown in Equation (5), below:

$$SuffixBackoff(w_1 \ldots w_n, i, k) = <w_{i-k}, \ldots w_{i-1}, BO> \quad (5)$$

These "suffix backoff" features fire, e.g., are assigned a value of "1" rather than "0," if the full n-gram $NGram(w_1 \ldots w_n, i, k)$ is not in the feature dictionary. This is directly analogous to the backoff weights in standard n-gram models, since it is a parameter associated with the prefix history that fires when the particular n-gram is unobserved.

Other general backoff features can also be used. For example, rather than just replacing the suffix, the prefix can be replaced, as shown in Equation (6), below:

$$PrefixBackoff(w_1 \ldots w_n, i, k) = <BO, w_{i-k+1}, \ldots w_i> \quad (6)$$

Next, multiple words in the feature can be replaced, to generalize across several such contexts, as shown in each of Equations (7) and (8) below:

$$PrefixBackoff_j(w_1 \ldots w_n, i, k) = <BO_k, w_{i-j}, \ldots w_i> \quad (7)$$

$$SuffixBackOff_j(w_1 \ldots w_n, i, k) = <w_{i-k}, \ldots w_{i-k+j}, BO_k> \quad (8)$$

These features indicate that an n-gram of length k+1 ending with (prefix), or beginning with (suffix), the particular j words, in the feature, are not in the feature dictionary. Note that, if j=k−1, then $PrefixBackoff_j$ is identical to the earlier-defined PrefixBackoff feature, and $SuffixBackoff_j$ is identical to SuffixBackoff.

For example, suppose that we have the following string S="we will save the snails" and that the 4-gram "will save the snails" does not exist in our feature dictionary. Then we can fire the following features at word $w_i$=5 ("snails"):

$SuffixBackoff(S,5,3)=<will,save,the,BO>$ $PrefixBackoff(S,5,3)=<BO,save,the,snails>$ $SuffixBackoff_0(S,5,3)=<will,BO_3>$ $SuffixBackoff_1(S,5,3)=<will,save,BO_3>$ $PrefixBackoff_0(S,5,3)=<BO_3,snails>$ $PrefixBackoff_1(S,5,3)=<BO_3,the,snails>$ As with n-gram feature templates, all such features may be included up to some specified length, e.g., for a trigram model, that includes n-grams up to length 3, including unigrams, bigrams and trigrams. Similarly, for prefix and suffix backoff features, we can have a maximum length and include in the possible feature set all such features of that length or shorter.

These new features may be used in maximum entropy language models, including models trained on very large corpora. Using such features may provide perplexity improvements when such features are included in the model alongside n-gram features. These features may also provide Word Error Rate (WER) performance when re-ranking the output of a baseline recognizer. In one example, the vocabulary of the model may include approximately 200 thousand words. Words may be selected from a baseline speech recognizer log, for example, selecting words emitted by the recognizer in the last 6 months of log files. All other words are mapped to a token "<UNK>" that represents an unknown word.

A trained maximum entropy model may be used for speech recognition, for example, to perform a voice search task. The model may use one or more of the different backoff features discussed above, including any sub-combination of the backoff features. Data sets may be assembled and pooled from anonymized supervised and unsupervised spoken queries (such as, search queries, questions, and voice actions) and typed queries to various websites or applications, from desktop and mobile devices. The overall training set, which may include billions of words, may be divided into K subsets. We assign subset $D^k$ to trainer k (where, $1 \leq k \leq K$). Then, distributed training (Algorithm 1) may be run using K machines. Since the amount of training data is very large, trainer k randomly samples data points from its subset $D^k$. Each epoch utilizes a different seed for sampling, which equals to the epoch number. As mentioned above, the trainer may terminate due to completing its subsample or due to a timeout. The timeout threshold may be fixed for each epoch.

A feature dictionary maps each feature key (e.g., trigram: "save the snails") to an index in the parameter vector θ. This dictionary may be built by iterating over all strings in our training data and make use of the NGgram function, defined above, to build the ngram feature keys, e.g., for every k=0 . . . 4. The dictionary may be built according to Algorithm 2, below:

Algorithm 2 Dictionary Construction for all $w_1, w_2, \ldots, w_n$ ∈ Data do
  for i ← 1 . . . n do
    ▷ We use 5-gram features.
    for k ← 0 . . . 4 do
      key ← NGram($w_1, \ldots, w_n$, i, k)
      $dict_k$ ← $dict_k$ ∪ {key}
      $count_k$[key] ← $count_k$[key] + 1
      ▷ Call the backoff functions above.
      bo_key ← SuffixBackoff($w_1, \ldots, w_n$, i, k)
      $dict_k$ ← $dict_k$ ∪ {bo_key}
      $count_k$[bo_key] ← $count_k$[bo_key] + 1
    end for
  end for
end for
▷ Retain the most frequent features in $dict_k$ and map each feature to a unique index, for each k = 0, . . . , 4.

Also, for each string, the backoff feature keys may be built as described in one or more of the functions indicated above. Upon collecting all of these keys, the total observed count for each feature key can be computed, and then only the most frequent feature keys can be retained. A different count cutoff can be assigned for each feature template. These counts can be determined based on a classical cross-entropy pruned n-gram model trained on the same data. Afterwards, the dictionary maps each key to a unique consecutive index=0 . . . Dim. The number of features dedicated for backoff features may significantly vary across backoff-feature types.

In some implementations, a maximum entropy model with backoff features may be used for speech recognition, for example, to re-score an n-best list of hypotheses. The n-best hypotheses may be received from a baseline recognizer, and a log likelihood score for every hypothesis may be assigned using output of the MaxEnt model, for example, as indicated by Equation (9), below:

$$Score = \Sigma_i \log P(w_i | w_{i-k}^{i-1}) \text{ (for } 1 \leq i \leq N\text{)}, \quad (9)$$

where N is the number of words in the hypothesis, and $P(w_i|w_{i-k}^{i-1})$ is determined according to Equation (2) above. In some implementations, the language model score assigned to each hypothesis is linearly interpolated with the baseline recognizer's language model score, for example, with a mixture factor of 0.25, 0.33, 0.50, 0.66, or 0.75, or another value. The mixing factor may be swept or varied from one application to another, and may be varied until a desired level of performance is achieved. In some implementations, the maximum entropy model may be used directly while decoding. For example, the maximum entropy model may be used to identify and score hypotheses, without another language model.

Any appropriate baseline speech recognizer may be used. As an example, a 5-gram model trained with Katz smoothing and entropy pruning may be used. The baseline recognizer may be trained on the same data as the MaxEnt model using Bayesian interpolation (if multiple sources are used). In some implementations, the baseline recognizer may have a vocabulary of tens of thousands, hundreds of thousands, or millions of words. The recognizer may have an out of vocabulary rate within a desired range, for example, an out of vocabulary rate on a training set or test set of approximately 5%, 3%, 1%, 0.5%, or 0.25%, or another value.

Any appropriate acoustic model may be used with a maximum entropy language model. As an example, the acoustic model may be a deep-neural network-based model. In one example, the network may process a context window of 26 (20 past and 5 future) frames of speech, each represented with 40-dimensional log mel filterbank energies taken from 25 ms windows every 10 ms. The system may be trained to a Cross-Entropy criterion on a data set collected from live voice search dictation traffic. The utterances may be hand-transcribed and force-aligned with a previously trained DNN. In some instances, large numbers of utterances, such as tens of thousands, hundreds of thousands of utterances, millions of utterances or more, may be used for training.

FIG. 1 is a flow diagram that illustrates an example of a method 100 for training an enhanced maximum entropy model. The method 100 may be performed by one or more computers.

N-grams are identified based on a set of training data (102). In some implementations, the n-grams are sequences of words. For example, the training data may be text, and the identified n-grams may be n-grams of words in the text. The n-grams may be of various different lengths, e.g., 5-grams, 4-grams, 3-grams, 2-grams, and 1-grams.

A particular integer value of k may be set, and n-grams can be identified in the training data for n-grams where n is equal to k or less than k. In some implementations, all n-grams that occur in the training data and meet the specified n-gram length criteria are identified. In some implementations, the identified n-grams include only n-grams in the training data that occur with at least a minimum frequency, e.g., n-grams that occur at least twice, or n-grams that occur at least 5 times, etc.

N-gram features corresponding to the identified n-grams are determined (104). Determining the n-gram features can involve selecting or defining which n-gram features to include in a maximum entropy model. Each n-gram feature may correspond to a particular one of the identified n-grams. In some implementations, a different n-gram feature is determined for each identified n-gram from the training data, or for each identified n-gram that has at least a minimum frequency of occurrence (e.g., at least two occurrences, etc.). An input corresponding to an n-gram feature may represent a decision whether a training example or an example to be evaluated has an n-gram matching the n-gram corresponding to the n-gram feature. The n-grams associated with n-grams can be listed in an n-gram feature dictionary for the model. Each n-gram feature can represent the last word in the n-gram occurring immediately after the sequence of words in the context.

For example, the training data may include text "I like to eat ice cream," and so an n-gram feature corresponding to the n-gram "I like to eat ice cream" can be determined. The input value for this n-gram feature represents a decision whether the language sequence being evaluated includes the word "cream" in the context of the 5-gram "I like to eat ice." For this n-gram feature, the corresponding input to the model n can be assigned a value of "1" to indicate that the current n-gram matches the corresponding n-gram for the n-gram feature, or assigned a value of "0" to indicate that the current n-gram does not match the corresponding n-gram for the n-gram feature. As a result, this n-gram feature would have a value of "1" for the n-gram "I like to eat ice cream," but would have a value of "0" for any other n-gram, such as the phrase "I don't like to eat ice cream" or "I like to eat ice castles."

N-gram features may be determined for n-grams of different lengths, e.g., for 5-grams, 4-grams, 3-grams, 2-grams, and 1-grams. For example, for the n-gram "I like to eat ice cream," a different n-gram feature may be defined for each of the identified n-grams "like to eat ice cream," "to eat ice cream," "eat ice cream," "ice cream," and "cream."

In some implementations, n-gram features may be defined in additional or alternative ways. As an example, a dictionary of words or an identified set of words from the training data may be used to compose n-grams for n-gram features. For example, for each identified n-gram having less than or equal to a maximum length, a different n-gram may be composed by adding a different word in the dictionary to the end of the n-gram. Thus each n-gram extracted from training data may be considered a context based on which multiple different n-grams and n-gram features may be generated.

As another example, portions or subsequences of n-grams may be identified as contexts after which other words occur, and n-grams for n-gram features may be composed based on those contexts. For example, from the n-gram "I like to eat ice cream," the final word "cream" may be removed to leave a 5-gram context "I like to eat ice." A different n-gram can be composed for each word in the dictionary occurring after this 5-gram context, and an n-gram feature of the model can be defined for each of the different n-gram composed.

One or more backoff features are determined, where the one or more backoff features correspond to n-grams that are not included in the identified n-grams (106). Determining the one or more backoff features can involve selecting or defining which backoff features to include in a maximum entropy model. Each backoff feature can represent a decision whether a current n-gram is different from the identified n-grams. A backoff feature can be have a value of "0" when the current n-gram matches one of the identified n-grams, and the backoff feature may have a value of "1" when the current n-gram does not match any of the identified n-grams.

For example, a backoff feature designated "backoff-3" may be given a value of "1" when the current n-gram includes a trig ram that is different from all of the other trigrams corresponding to the various n-gram features. In this manner, the "backoff-3" could be activated when an n-gram includes any of multiple trigrams that were unseen or infrequently seen in the training data. If the trigram of the current n-gram matches a trigram corresponding to one of the n-gram features, then the "backoff-3" backoff feature may be assigned a value of "0." Backoff features may be defined for different lengths, for example, different backoff features may respectively represent whether 5-grams, 4-grams, 3-grams, 2-grams, and 1-grams different from the identified n-grams have occurred.

In some implementations, backoff features may be determined for classes or groups of n-grams including particular words or phrases. For example, a backoff feature "<backoff-3, house>" may represent whether the word "house" occurs as the third word of a trigram that does not have a corresponding n-gram feature. Similar backoff features may be determined for n-grams of different lengths, or for n-grams ending in each of the different words in a vocabulary. Other backoff features may include a specific word or phrase at the beginning or middle of the n-gram, rather than the end.

In some implementations, the backoff features may be defined so that there is a back-off feature for each n-gram feature. For example, a one-word suffix backoff feature may be defined for each n-gram feature. Thus from the n-gram feature for "I like to eat ice cream," the backoff feature "<I like to eat ice, backoff-1>" may be defined. This backoff feature, when assigned a feature value of "1," represents the occurrence of a sequence of six words that is different from all the six-word sequences in the n-gram feature dictionary. In particular, it indicates that the sequence begins with the context "I like to eat ice" and ends with a final word (represented by the "backoff-1" term) that none of the n-grams in n-gram feature dictionary include in that context. A similar one-word suffix backoff feature may be defined for each n-gram of the n-gram features.

Other backoff features can be defined for some or all of the n-grams in the n-gram feature dictionary. For example, suffix backoff features of different lengths can be defined, e.g., "<I like to eat, backoff-2>," "<I like to, backoff-3>," and so on. Similarly, prefix backoff features can be defined, e.g., "<backoff-1, like to eat ice cream>," "<backoff-2, to eat ice cream>," and so on. Backoffs of any portion of an n-gram may be defined, e.g., <backoff-1, like to eat ice, backoff-1>," "<I, backoff-4, cream>," "<backoff-1, like, backoff-2, ice, backoff-1>," and so on.

A maximum entropy model is generated and trained to have the n-gram features and backoff features determined above (108). The training process can involve determining feature values for n-gram features and backoff features, and providing those features to the model. For example, the maximum entropy model may include the n-gram features and backoff features, and may be trained to indicate likelihoods of occurrence based on feature values for the n-gram features and backoff features. A feature value for an n-gram feature may indicate whether a current n-gram matches the n-gram corresponding to the n-gram feature. A feature value for a backoff feature may indicate whether at least a portion of the current n-gram is not included in a predetermined set of n-grams, such as the set of identified n-grams extracted from the training data.

The maximum entropy model may be a log-linear model. The feature values for the n-gram features and the feature values for the one or more backoff features may be binary values. The maximum entropy model may be a language model or another type of model. After training, a language model may be used to generate an output indicative of a likelihood of occurrence of a term after one or more previous terms, or to estimate the likelihood of occurrence of a phrase.

In some implementations, the maximum entropy model includes, for each word in the model's dictionary, a weight or score for each feature. For example, if the n-gram features and backoff features total 100M features, there may be 100M weights in the model. Training the model may include setting and adjusting values of the weights.

In some implementations, the weights for some or all of the backoff features may cause the model to decrease the likelihood that the model provides. For example, the model can be trained so that when a backoff feature is activated, indicating that at least a portion of the current n-gram does not have a corresponding n-gram feature, the weight for the backoff feature acts as a penalty to decrease the likelihood indicated by the model.

In some implementations, the maximum entropy model is trained using a stochastic gradient descent algorithm. Training tasks may be distributed across multiple different computing devices. In some implementations, a MapReduce processing framework is used to perform the training. During the training process, the weights or scores within the model are adjusted. The weights for the backoff features are trained as well as the weights for the n-gram features. As a result, the training process may attribute a non-zero probability to the occurrence of the various backoff features. Similarly, the backoff features will be assigned different values for their respective weights as a result of the training. For example, the weight for "<backoff-3, house>" will likely have a different weight than "<backoff-3, school>," since 4-grams ending in "house" and 4-grams ending in "school" will occur in different frequencies in the training data. Similarly, training will generally adjust the weights so that the weights for "<backoff-3, house>," "<backoff-2, house>," and "<backoff-2, my house>" are different, as each represents a different set of n-grams that may occur and the usage of those n-grams will be different for one set to the other.

In some implementations, features may be removed from the model at various steps of training. For example, backoff features that are uncommonly used, or that have corresponding weights that are within a threshold range may be pruned to limit the size of the model. Features to prune from the model may be identified based on cross-entropy measures, for example, to identify the features that provide the smallest effect on the predictions of the model.

Features can be defined to indicate any particular element of the context in which a language occurs. Features representing different combinations of contextual attributes are referred to as context features. The n-gram features discussed above are examples of context features representing linguistic contests. As discussed further below, part of the method 100 can include determining features for a model that include elements of non-linguistic context. For example, a feature can correspond to aspects of time, location, user attributes, tasks or domains, and other factors. For example, a feature may be defined to represent that language occurs in a particular city or country. Accordingly, context features "<city=Paris>" or "<country=France>" may be defined to represent whether a language sequence occurs in the corresponding location. Such features may be defined for each of a set of locations, e.g., "<city=Paris>," "<city=Berlin>," "<city=London>," and so on. Backoff features can also be defined for elements of non-linguistic. For example, a backoff feature "<city_backoff>" can represent whether a language sequence occurs in an unknown city (e.g., a city for which there is no corresponding context feature in the model). Context features and backoff features may also represent the co-occurrence of non-linguistic contextual factors and linguistic contextual factors. For example, a context feature "<city=Paris; hello>" can represent the occurrence of the word "hello" in Paris, and the backoff feature "<city_backoff; hello>" can represent the occurrence of the word "hello" in an unknown city. Thus, in the method 100, the steps regarding the determination of n-gram features can be performed for context features corresponding to attributes other than pure n-grams, and backoff features can represent a backoff from any contextual element and not only from n-gram context.

Figure 2:
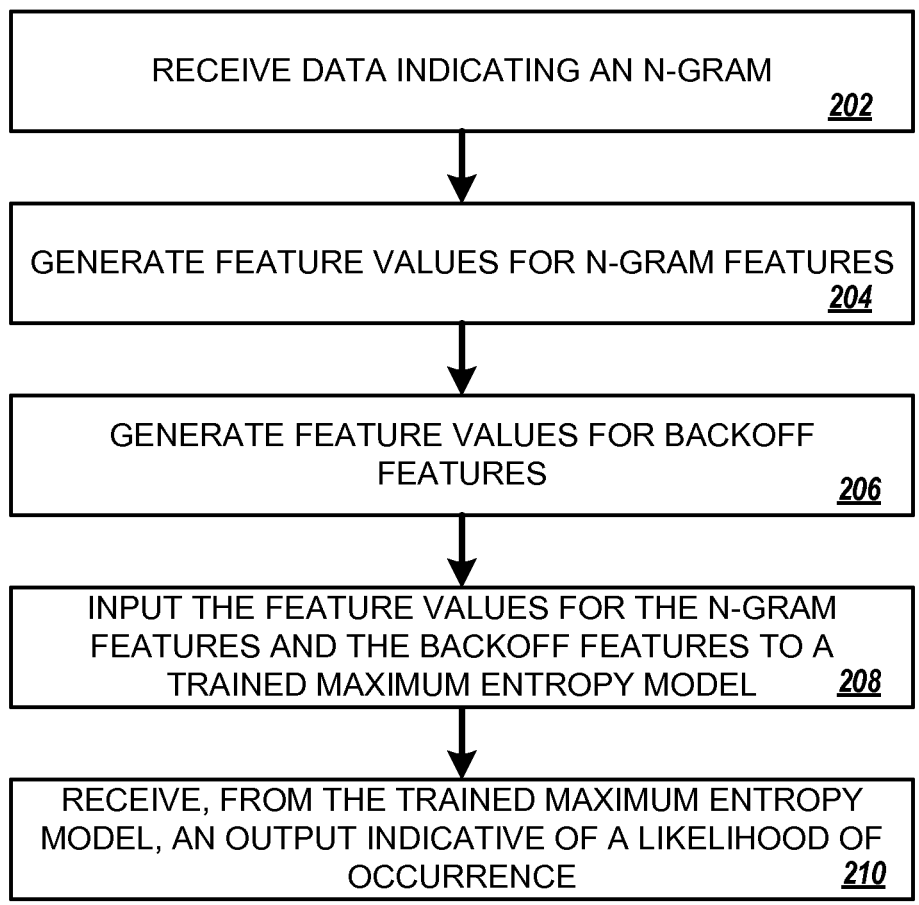
FIG. 2 is a flow diagram that illustrates an example of a method for using an enhanced maximum entropy model.

FIG. 2 is a flow diagram that illustrates an example of a method 200 for using an enhanced maximum entropy model. The method 200 may be performed by one or more computers.

Data indicating an n-gram is received (202). For example, data indicating a sequence of words may be received. The sequence of words may include a context, such as one or more previously transcribed words spoken by a user, followed by a candidate transcription for a further utterance of the user.

A first set of feature values are determined, based on the indicated n-gram, for n-gram features of the model (204). For example, the feature values for the n-gram features may each indicate whether the indicated n-gram matches an n-gram corresponding to the n-gram feature. For example, if the indicated n-gram is the phrase "I like the," the n-gram feature corresponding to the trigram "I like the," the n-gram feature corresponding to the bigram "like the," and the n-gram feature corresponding to the unigram "the" may each be assigned a value of "1" to indicate a match to the n-grams corresponding to these features. All other n-gram features may be assigned a value of "0" to indicate that the n-gram does not match the n-grams corresponding to these other n-gram features.

A second set of feature values are determined, based on the indicated n-gram, for one or more backoff features (206). The feature values for the n-gram features may each indicate whether a portion of the indicated n-gram is not included in a predetermined set of n-grams, such as the set of n-grams corresponding to the respective n-gram features.

As an example, a dictionary of n-grams corresponding to the n-gram features may be accessed. Indeed, a feature dictionary may be obtained that indicates (i) each feature in the model, (ii) corresponding n-gram(s), and (iii) the position or index of the feature within the set of features of the model. To determine a feature score for a trigram backoff feature, a trigram from the indicated n-gram may be compared with the n-grams in the dictionary. If the trigram is not included in the dictionary, the trigram backoff feature may be assigned a value of "1." If the trigram matches one of the trigrams in the dictionary, e.g., there is an n-gram feature corresponding to the trigram, then the trigram backoff feature may be assigned a value of "0." As discussed above, there may be multiple backoff features for a given n-gram length. For example, in addition to a backoff "<backoff-3>," There may be backoffs representing other subsets of trigrams, including trigrams in which portions of the trigram are specified to include specific words, e.g., "<backoff-2, today>," "<backoff-2, the>," "<backoff-2, and>," "<backoff-1, you and>," and so on.

Feature values may be determined for multiple different backoff features, for example, for backoff features of different n-gram lengths. In some implementations, one or more backoff features may be determined for 1-grams, 2-grams, 3-grams, 4-grams, and/or other lengths of n-grams. Feature values may be determined for each of the backoff features for each of the different n-gram lengths.

In some implementations, a backoff feature may correspond to a certain type of context or to contexts that meet criteria other than length. For example, multiple trigram backoff features may be used, where each trigram backoff feature represents the set of trigrams ending with a specific word in a vocabulary. One backoff feature may represent all trigram contexts that are not in the dictionary and that end in the last word "the." Another backoff feature may represent all contexts that are not in the dictionary and that end with the word "house." Similar trigram backoff features may respectively represent the trigrams ending with each other word in the vocabulary. Similar sets of backoff features can be used for different context lengths, e.g., 2-grams, 4-grams, and other context lengths, and/or specific words or types of words at specific positions in the context.

The first set of feature values and the second set of feature values are input to a trained maximum entropy model (208). The maximum entropy model may be a model trained as discussed above with respect to FIG. 1. The maximum entropy model may be a log-linear model. The maximum entropy model may be a language model or another type of model. In some implementations, the maximum entropy model has been trained to decrease a likelihood that the model estimates for the n-gram in response to receiving at least one feature value that indicates that at least a portion of the indicated context does not correspond to any of the n-gram features. For example, the model may apply a penalty when one or more backoff features are activated.

In some implementations, the feature values for the n-gram features and the feature values for the one or more backoff features are binary values, e.g., each feature value is "1" or "0." The feature values for the n-gram features can indicate whether the indicated n-gram matches n-grams associated with the respective n-gram features. The feature values for the one or more backoff features indicate whether the at least a portion of the indicated n-gram differs from the n-grams associated with the respective n-gram features.

An output is received from the trained maximum entropy model (210). The output may be indicative of a likelihood of occurrence of the indicated n-gram, or of a portion of the n-gram given other portions of the n-gram. In some implementations, outputs of the model are obtained for each of multiple words in a sequence, and the various outputs are used to determine a score, such as a probability or confidence score, for the sequence.

In some implementations, receiving data indicating the n-gram comprises receiving data indicating a sequence of terms. Generating the first set of feature values for the n-gram features based on the indicated n-gram comprises generating feature values for n-gram features based on the sequence of terms. Generating the second set of feature values for the one or more backoff features based on the indicated n-gram comprises generating the second set of feature values for the one or more backoff features based on whether at least a portion of the sequence of terms is different from n-grams corresponding to the n-gram features. Inputting the first set of feature values and the second set of feature values to the trained maximum entropy model comprises inputting the first set of feature values and the second set of feature values to a trained language model. Receiving an output can include receiving, from the trained language model, an output indicative of a likelihood that a particular term occurs after the sequence of terms.

The method 200 may include determining and inputting feature values for context features or backoff features that correspond to elements of non-linguistic context in addition to or instead of elements of linguistic context. For example, feature values for any or all of the context features and backoff features in the model may be determined and used. Thus, the feature values may indicate, for example, aspects of time, location, user attributes, tasks or domains, state of a computing device, and so on, in addition to or instead of indicating aspects of linguistic context.

Figure 3:
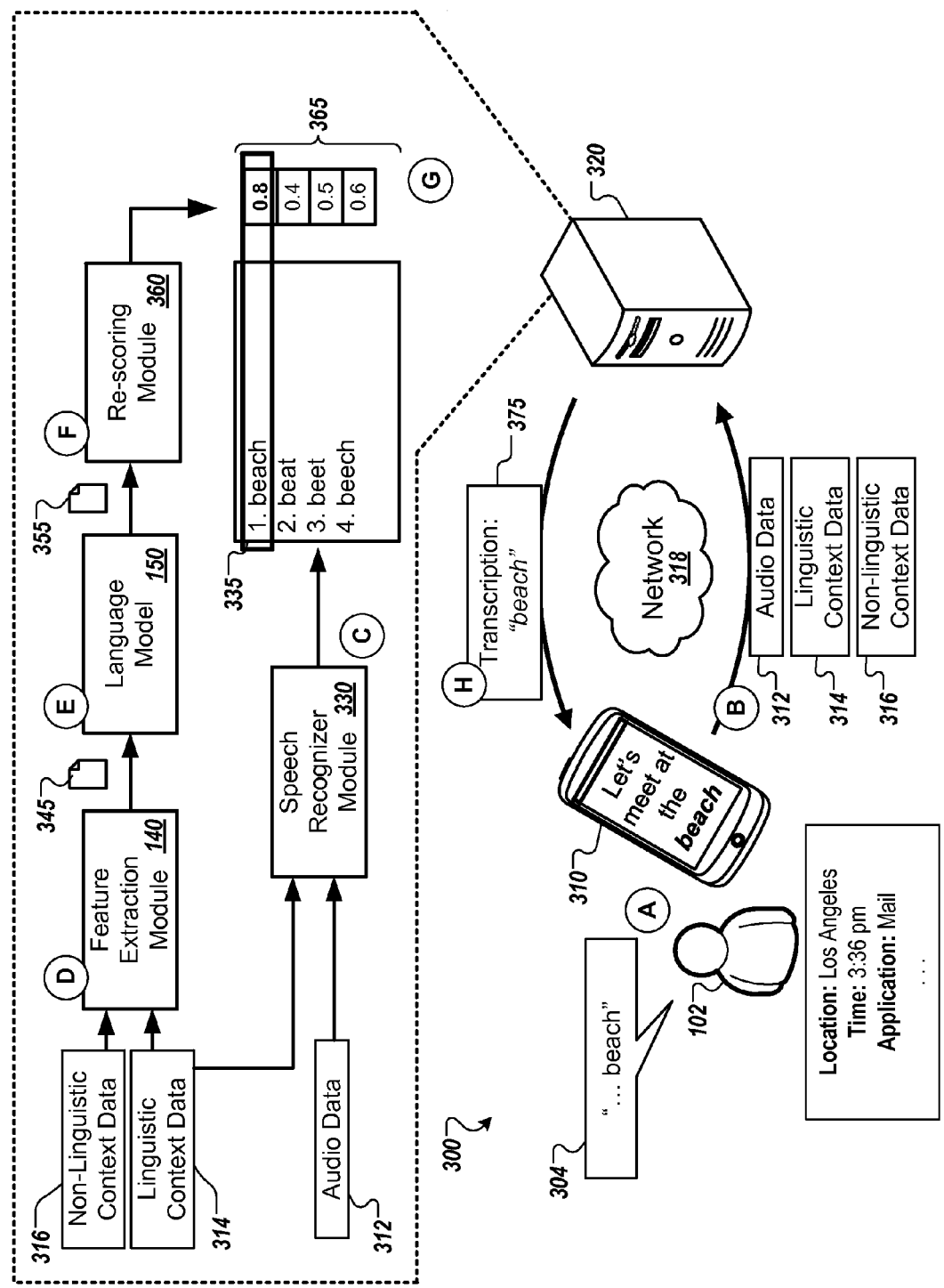
FIG. 3 is a diagram that illustrates an example of a system for speech recognition using a maximum entropy model.

FIG. 3 is a diagram that illustrates an example of a system 300 for speech recognition using a maximum entropy model. The system 300 includes a client device 310, a computing system 320, and a network 318. The computing system 320 receives audio data 312 and, in some implementations, linguistic context data 314 and/or non-linguistic context data 316 from the client device 310. The computing system 320 provides scores determined from the non-linguistic context data 316 to a language model 350, which provides output that the computing system 320 uses to determine a transcription for the audio data 312. The figure shows stages (A) to (H) which illustrate a flow of data.

The client device 310 can be, for example, a desktop computer, a laptop computer, a cellular phone, a smart phone, a tablet computer, a music player, an e-book reader, a wearable computer, a navigation system, or other device. The functions performed by the computing system 320 can be performed by individual computer systems or can be distributed across multiple computer systems, e.g., one or more server systems. The network 318 can be wired or wireless or a combination of both, and may include private networks and/or public networks, such as the Internet.

In some implementations, a system receives audio data indicating characteristics of an utterance and context data indicating non-linguistic context of the utterance. Scores for one or more non-linguistic features can be generated based on the context data. The scores can be provided to a language model trained to estimate likelihoods based at least in part on scores for non-linguistic features. Output of the language model can be received and used to determine a transcription for the utterance. In some implementations, the language model is a log-linear model or maximum entropy model. In some implementations, the language model comprises a support vector machine model, a neural network, a set of classifiers, or another type of model.

In the example of FIG. 3, during stage (A), a user 302 speaks and the client device 310 detects the utterance 304 of the user 302. For example, the client device 310 may record the utterance 304 using a microphone. The user 302 may provide the utterance 304 as voice input to any of a variety of applications, including, for example, an e-mail application, a calendar application, a mapping or navigation application, and so on. Thus, the utterance 304 may represent any of a variety of types of input, for example, a query, a message recipient, the body of a message, a voice command, an address, a phone number, and so on.

In the illustrated example, the user 302 is dictating the contents of an e-mail message while a "Mail" application is running on the client device 310. The user 302 previously entered the text "Let's meet at the" as part of the message, and the utterance 304 includes the word "beach" as further input to add to the message.

During stage (B), the client device 310 collects information and sends information to the computing system 320 over the network 318. The information may be sent with, for example, a request for a transcription of the utterance. For example, the client device 302 sends audio data 312 for the utterance 304 to the computing system 320. The audio data 312 may be, for example, a recording of the utterance 304, or information derived from the detected utterance 304, such as filterbank energy values, mel-frequency cepstral coefficients (MFCCs), or scores for other acoustic features.

The client device 310 may also send linguistic context data 314 that indicates a linguistic context for the utterance 304. For example, the client device 310 may provide data that indicates the words that the utterance 304 follows. In the illustrated example, the linguistic context data 314 indicates the words "Let's meet at the" that immediately precede the utterance 304. In some implementations, the linguistic context data 314 provides a specific amount of text, for example, the previous one, two, three, five, or ten words, or the text recognized within a predetermined amount of time. The linguistic context may include words that were previously spoken by the user and are recognized, and/or text that was entered or accessed in another manner. For example, a user could open a text file, place a cursor at a particular position in the text, and begin speaking to insert additional text. Some amount of text before the cursor may be provided as linguistic context, regardless of how the text in the file was entered.

The client device 310 may also determine and send non-linguistic context data 316 to indicate a non-linguistic context for the utterance 304. The non-linguistic context data may indicate, for example, characteristics of the environment in which the utterance 304 is spoken. The non-linguistic context data 314 can indicate factors related to the physical environment of the user 302 or client device 310, such as geographical location, time, temperature, weather, or ambient noise. The non-linguistic context data 314 can provide information about the physical state of the client device 310, for example, whether the device 310 is moving or stationary, the speed of movement of the device 310, whether the device 310 is being held or not, a pose or orientation of the device 310, whether or not the device 310 is connected to a docking station, and/or the type of docking station to which the client device 310 is connected. The non-linguistic context data 314 can provide information about the operating state of the client device 310, for example, an identifier for an application running on the client device 310, or a category or classification for the application to which that the utterance 304 was provided as input. Similarly, the non-linguistic context data can indicate a particular input field, input field label, an input text format for a field, an identifier for a web page or Internet domain, or other information. The non-linguistic context data 314 can also indicate information about the user 302 that spoke the utterance, for example, a user identifier, whether the user is male or female, or other information from a user profile for the user.

In the illustrated example, the client device 310 determines its location, for example, using a global positioning system (GPS) module or other techniques, and determines that the client device 310 is located in the city of Los Angeles. The client device 310 also determines that the utterance 304 was recorded as input to a mail application running on the client device 310. The client device 310 provides data indicating the location, e.g., "Los Angeles," and the active application, e.g., the "Mail" application, to the computing system 320 as non-linguistic context data 316. The client device also provides the audio data 312 and the linguistic context data 314 to the computing system.

During stage (C), the computing system 320 uses a speech recognizer module 330 to determine candidate transcriptions 335 for the utterance 304. The candidate transcriptions 335 may be provided as, for example, a list, a word lattice, or in other forms. The candidate transcriptions 335 may be scored or ranked to indicate which candidate transcriptions 335 the speech recognizer module 330 estimates to be most likely to be correct transcriptions. In the illustrated example, the candidate transcriptions 335 represent a set of highest ranking or most likely transcriptions, as estimated by the speech recognizer 330. This set can be an n-best list, including, for example, the top 3, 5, 30, 25, or other integer number of candidate transcriptions.

In some implementations, the speech recognizer module 330 uses an acoustic model and a language model to identify the candidate transcriptions 335. The models used by the speech recognizer module 330 may or may not use non-linguistic context data to determine candidate transcriptions. Accordingly, in some instances, the candidate transcriptions 335 may be determined based on the audio data 312 and the linguistic context data 314, without being influenced by the non-linguistic context data 316. Another language model may use information about the non-linguistic context to re-score or re-rank the candidate transcriptions 335 to improve accuracy. In some implementations, the speech recognizer module 330 may use the non-linguistic context data 316 to identify and/or score the candidate transcriptions 335.

During stage (D), the computing system 320 uses a feature extraction module 340 to determine feature values 345 for various different features. The set of features that feature values 345 are determined for is the set of features defined in a language model 350 that will receive the feature values 345 as input. The feature extraction module 340 can determine which n-gram features and backoff features should be set as active, and which should be set as inactive. For example, the computing system 320 can evaluate each candidate transcription to determine a likelihood of occurrence of the candidate transcription given the context.

To determine which features to set as active by assigning a feature value of "1," the computing system 320 may compare n-grams comprising a candidate transcription and at least a portion of the context to n-grams in an n-gram feature dictionary for a language model 350. For the candidate transcription "beach," the computing system 320 can determine whether the n-gram "Let's meet at the beach" matches any of the 5-grams in the n-gram feature dictionary. If there is a matching 5-gram, the matching n-gram feature is given a feature value of "1," and all other n-gram features for 5-grams are given a feature value of "0." Similarly, since the 5-gram was found to have a corresponding n-gram feature, none of the backoff features are activated (e.g., all are given a value of "0") By contrast, if none of the n-gram features match "Let's meet at the beach," then one or more backoff features will be activated. For example, each of the following prefix backoff features may be activated if they are defined as part of the model 150: "<backoff-5>," <backoff-4, beach>," "<backoff-3, the beach>," "<backoff-2, at the beach>," "<backoff-1, meet at the beach>." Suffix backoff features, e.g., "<Let's meet at the, backoff-1>," and other backoff features may also be activated based on the context. All other backoff features that do not correspond to the n-gram under evaluation, e.g., "<backoff-4, house>" or "<backoff-3, the roof>," would be assigned a value of "0."

In a similar manner, the evaluation of candidate transcription "beach" would also involve determination of feature scores for features corresponding to n-grams with lower values of n. For example, feature scores n-gram features and backoff features representing 4-grams would be determined with respect to the 4-gram "meet at the beach," feature scores for features representing 3-grams would be determined with respect to the 3-gram "at the beach," and so on.

During stage (E), the feature values 345 are provided as input to the language model 350. Based on the feature values 345, the language model 350 provides a set of output values 355, which may indicate likelihoods that one or more words will occur in the current context. The language model 350 can be a model that has been trained to estimate the likelihood of a word or phrase occurring based on scores for linguistic and/or non-linguistic features. For example, the language model 350 can determine a posterior probability of a current word, e.g., the first word of the utterance 304, given information about the context for the utterance 304, which may include linguistic context, e.g., the prior words "Let's meet at the," and/or non-linguistic context, e.g., location, device state, application, user characteristics, etc. The feature values 345 are determined in stage (D) for the features that the language model 350 was trained to be able to process and use to determine word likelihoods.

The language model 350 may include a set of internal weights that represent the training state of the language model 350. These weights may indicate how various aspects of context make words more or less likely to occur. Typically, the weights in the language model 350 are set during training of the language model 350 and do not change during use of the language model. However, the weights are trained using examples of input from a variety of different users and different environments, so the language model 350 is able to estimate likelihoods of words occurring given many different types of linguistic and non-linguistic contexts.

In some implementations, the language model 350 is a log-linear model. Log-linear models may effectively take into account scores from large numbers of features and scores for features of multiple different types. For example, a log-linear model may be used to combine word n-gram feature values with feature values indicating physical environment, user characteristics, and other factors. In some implementations, log-linear models may provide greater efficiency or smaller storage requirements than, for example, hidden Markov models (HMMs) or other statistical models.

In some implementations, the language model 350 may be a maximum entropy model. Other types of models and other training techniques may additionally or alternatively be used. For example, support vector machines, neural networks, classifiers, and other types of models may be used to process various contextual features, including linguistic feature values, non-linguistic feature values, and/or other types of information. As an example, an integrated circuit or other device could implement a neural network to serve as a language model. As another example, a set of multiple classifiers could each be trained to process one or more feature values, and a system could combine the outputs of the classifiers to indicate a probability of occurrence of a word or other lexical item. In general, any appropriate model may be used, where the model receives values for contextual features and provides output indicative of a likelihood of occurrence of a word based on the received values.

The output values 355 provided by the language model 350 may be, for example, scores indicating likelihoods of occurrence of different words given the context indicated by the feature values 345. For example, the language model 350 may indicate a posterior probability $P(y|X)$, or values from which the probability may be determined, where y represents a lexical item, such as a word, number, URL, or other lexical item, and X is a vector including the feature values 345.

In some implementations, the language model 350 may be used to obtain a score for each of multiple different words within a particular candidate transcription. For example, the techniques described above can be used to determine an output of the language model 350 for a first word of a candidate transcription. Then, using an assumption that the first word of the candidate transcription is correct, the same techniques may be used to determine an output of the language model 350 for the second word in the candidate transcription. For this second word, the linguistic context has changed, e.g., by the inclusion of the first word of the candidate transcription. To reflect the updated linguistic context, the computing system 320 may use the feature extraction module 340 to determine a new set of feature values that are appropriate for the new context. In this manner, the computing system 320 may use the language model 350 to determine a score for each of the words in each of the candidate transcriptions 335, based on the particular sequence of words that each word follows.

During stage (F), the computing system 320 uses a re-scoring module 360 to determine scores 365 for the different candidate transcriptions 335. If a candidate transcription includes multiple words, the outputs from the language model 350 for each of the different words of the candidate transcription can be used by the re-scoring module 360 to determine a score 365 indicating a likelihood of occurrence of each candidate transcription as a whole, given the context in which the utterance was spoken.

During stage (G), the computing system 320 selects a transcription for the utterance 304 based on the scores 365. For example, the computing system 320 may select the candidate transcription 335 having the score 365 that indicates the highest likelihood of occurrence.

During stage (H), the computing system 320 provides the selected transcription to the client device 302. The client device 302 may insert the transcription in the application that is running, to complete the user's intended phrase, "Let's meet at the beach."

In the example shown in FIG. 3, non-linguistic context data is used to re-score candidate transcriptions 335 that were determined without taking into account non-linguistic context data. In some implementations, the speech recognizer 330 may use a language model, such as the language model 350, that uses non-linguistic context data to select and rank the candidate transcriptions. In these implementations, a separate re-scoring process may not be needed.

In some implementations, the input to the language model 350 may include only feature values for non-linguistic features. In other implementations, feature values may be provided for both linguistic and non-linguistic features. In some implementations, a language model that determines likelihoods using both linguistic and non-linguistic features may have better accuracy than a language model that provides scores based on only linguistic features or only non-linguistic features.

In some implementations, the backoff features may include backoff features corresponding to elements of non-linguistic context. For example, some standard features or n-gram features may represent the occurrence of a word or other outcome with a context that includes a particular time, e.g., time of day, day of the week, date, year, etc., or range of time, a particular geographical location, e.g., country, state, city, zip code, etc., or a particular user characteristic, e.g., a user's gender, age, educational level, primary language spoken, etc. A feature may be defined with respect to multiple different types of context, e.g., "<user=male; city=Los Angeles; day=Saturday; weather>" to represent a male user in Los Angeles using the word "weather" on a Saturday.

Examples include features representing the occurrence of specific words in different cities, such as features (i) "<city=Philadelphia; cheese steak>" representing the phrase "cheese steak" being used in Philadelphia, and (ii) "<city=New York City; cheesecake>" representing the word "cheesecake" being used in New York City. For this example, backoff features may be used to represent the occurrence of a city and word combination that has no specific feature in the model 350. For example, backoff feature "<city=Philadelphia; backoff-1>" can correspond to the occurrence of any word at the location of Philadelphia, where the model 350 does not have a feature for that word in Philadelphia. In addition, or as an alternative, a backoff feature may represent any of multiple cities, e.g., "<city_backoff; cheese steak>", which can represent the occurrence of the term "cheese steak" in an unknown city or any city that does not have a specific feature in the model 350 for the occurrence of "cheese steak" in that city. Further backoffs can be defined, such as "<city_backoff; cheese backoff-1>" or "<city_backoff; backoff-2>," with each feature represents different combinations of words and cities.

As another example, features of a model may ask a question about the domain of the input. For example, the feature may include a component indicating whether the input was entered for a particular domain. Examples of different domains may be different types of searches, e.g., web search, image search, movie library search, etc. As additional examples, different domains may represent different categories of applications or tasks, e.g., voice search, e-mail, shopping, voice commands, navigation, and so on. Features may represent a question as to whether a specific word or phrase occurs in a specific domain, e.g., "<domain=VoiceSearch; who>" which calls for a binary input indicating whether the word "who" occurred in the context of a voice search domain. Backoff features can correspond to instances where a combination of words or phrases with a domain does not have a corresponding feature in the model, e.g., "<domain_backoff; who>" or "<domain_backoff; main street>." For example, if a user speaks the word "who" for a navigation application, and there is no corresponding feature for that word in that specific context, the backoff feature "<domain_backoff; who>" can be activated. This indicates that, the domain component had to be omitted or backed off since the combination did not have a corresponding feature in the model.

In some implementations, the language model 350 may indicate the likelihood of occurrence of sequences of language units other than words. For example, the language model 350 may predict n-grams of characters, phonemes, or other language units. In such implementations, the language model 350 has n-gram features and backoff features based on for n-grams of the type of language unit used. For example, when the language units for a language model are phonemes, each n-gram feature represents a specific n-gram of phonemes, and each backoff feature represents a set of n-grams that include the same number of phonemes (e.g., the same order or n-gram length) and that do not have a corresponding n-gram feature in the model 350.

Figure 4:
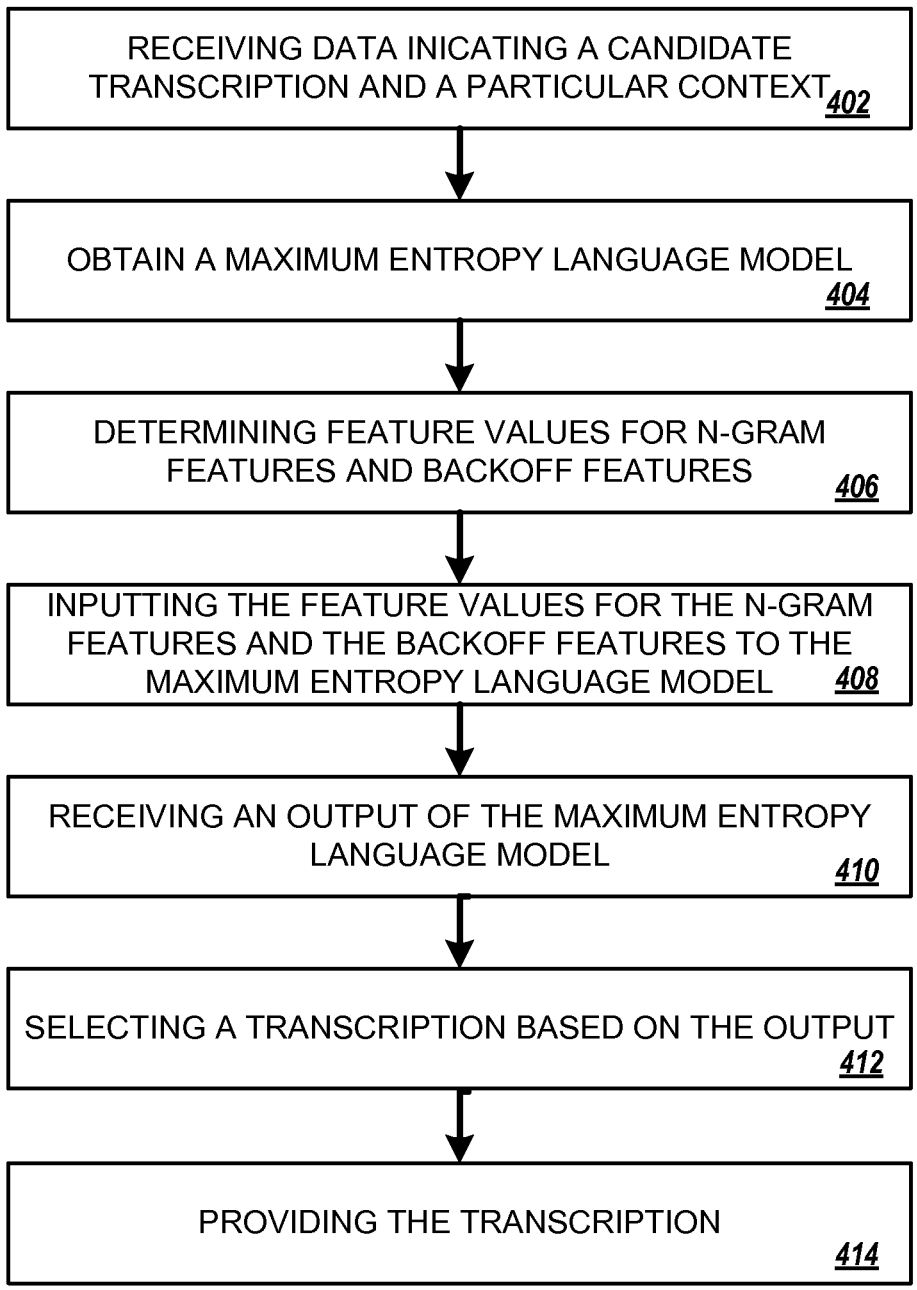
FIG. 4 is a flow diagram that illustrates an example of a method for using an enhanced maximum entropy model.

FIG. 4 is a flow diagram that illustrates an example of a method 400 for using an enhanced maximum entropy model. The method 200 may be performed by one or more computers.

Data is received, where the data indicates (i) a candidate transcription for an utterance and (ii) a particular context for the utterance (402). The candidate transcription may be provided in any of various forms, such as text, a word lattice, a set of phonemes, and so on. The context can include a sequence of one or more language units, for example, a sequence of one or more words that immediately precede the candidate transcription.

A maximum entropy language model is obtained (404). The maximum entropy language model may include (i) scores for one or more n-gram features that each correspond to a respective n-gram and (ii) scores for one or more backoff features that each correspond to a set of n-grams for which there are no corresponding n-gram features in the maximum entropy language model. The maximum entropy language model may be a log-linear model, and the scores may be weights of the log-linear model that have been adjusted through training. The model may be a model trained to indicate a likelihood of occurrence of a word or phrase given one or more prior words or phrases. The model can be a model that has been trained to indicate a non-zero probability of occurrence of sets of n-grams represented by the backoff features. The maximum entropy language model may be normalized.

Determining the feature values may include determining multiple second feature values that each separately indicate the occurrence of an n-gram having a particular number of words, the multiple second feature values corresponding to different backoff features and indicating that different portions of the particular context occurred within an n-gram having the particular number of words. For example, in one example, for the phase "I have a friend," backoff features "backoff-1 have a friend" and "backoff-2 a friend" may be activated if the model does not include n-gram feature for "I have a friend."

In some implementations, the feature values for the n-gram features indicate whether a particular n-gram comprising the candidate transcription and the particular context matches n-grams associated with the respective n-gram features. The feature values for the backoff features indicate whether the portions of the particular n-gram are different from the n-grams associated with the respective n-gram features.

Features values may be determined for features corresponding to n-grams of a lower value of n than the full particular context for a candidate transcription. At least one of the feature values for the backoff features may indicate that a portion of the particular context having particular size is different from the each of the contexts of the particular size that are associated with n-gram features in the model.

In some implementations, the maximum entropy language model may include score for each context in a set of different contexts that each comprise a different sequence of one or more words. For each specific context, the model can include scores for multiple different n-gram features that each correspond to the occurrence of a respective word with the context. The respective words form a set of words. For example, if a model includes n-gram features for n-grams "I have a dollar," "I have a pen," and "I have a tool," the context may be the phrase "I have a," and the set of words that occur with this context may be the set "dollar," "pen," and "tool." For the specific context, the model can also include a backoff feature that corresponds to the occurrence of any of multiple words with the context. For example, the backoff feature may correspond to the occurrence, with the context, of any word that is not in the set of words for the n-gram features. One example a backoff feature would be a feature corresponding to sequence "I have a backoff-1," where the term "backoff-1" represents any single word that is not in the set "dollar," "pen," and "tool." Because the "backoff-1" term can be any of multiple words, the backoff feature can represent any of multiple different language sequences. Notwithstanding the backoff feature described in this example, different backoff features, or multiple backoff features, may be determined for a context or for different portions of a context.

In some implementations, the maximum entropy language model may include score for each context in a set of different contexts that each comprise a different sequence of one or more words. For each specific context, the model can include scores for multiple different n-gram features, with each n-gram feature corresponding to a respective language sequence that (i) includes the sequence of one or more words of the context, and (ii) is formed of a same, particular number of words. To use an example similar to the one discussed above, the n-grams features may correspond to n-grams "I have a dollar," "I have a pen," and "I have a tool," which each have four words. For the specific context, the model may include one or more backoff features that each correspond to a set of multiple language sequences, wherein, for each backoff feature, each language sequence in the set of language sequences (i) is formed of the particular number of words, (ii) comprises a particular subset of the one or more words of the context, and (iii) omits a particular sub-sequence of words within the context. For example, one backoff feature may correspond to the sequence "backoff-1 have a dollar." For this feature, the sequence corresponds to a specific n-gram length in which n is four, and the sequence includes part of the context, e.g., "have a," while omitting at least a part of the context, e.g., "I."

A backoff term, e.g., the term "backoff-1," is a placeholder or catchall to indicate that a portion of the context has been omitted, opening up the space to any single word that would not form one of the n-grams for n-gram features of the model. The term "backoff-1" represents any single word that does not have a 4-word-long n-gram feature for the word being followed by "have a dollar." Other backoff features, such as those corresponding to sequences "backoff-2 a dollar," "backoff-3 dollar," "backoff-4," may be additionally or alternatively used by a model. Similarly backoff features for sequences "backoff-1 have a pen" or "backoff-1 have a tool," and others may additionally or alternatively be used. Indeed, the backoff features may include multiple backoff features that correspond to different sets of language sequences that include different portions of the context.

Feature values are determined for features of the maximum entropy language model (406). A feature value may be determined for (i) each of the one or more n-gram features of the maximum entropy language model and (ii) each of the one or more backoff features of the maximum entropy language model. In some implementations, the feature values may be determined using a feature dictionary that indicates each of the n-grams corresponding to n-gram features of the maximum entropy language model. Each of the feature values may be a binary value.

Feature values for one or more backoff features may be given values that indicate that a language sequence has occurred for which the model does not include a corresponding n-gram feature. A backoff feature that is activated may indicate a specific n-gram length, and/or may specify specific words being present at specific positions within the language sequence. A backoff feature being activated, or having a value of "1" determined, may be based on determining that at least a portion of the particular context does not correspond to any of the n-gram features.

In some implementations, determining the feature values includes identifying a particular n-gram that includes words of the candidate transcription immediately following a sequence of words indicated by the particular context. The n-gram of words can be formed of a particular number of words. Further it can be determined that the maximum entropy language model does not have an n-gram feature corresponding to the particular n-gram. This may be done, for example, by comparing the particular n-gram with n-grams in the n-gram feature dictionary. In response to determining that the maximum entropy language model does not have an n-gram feature corresponding to the particular n-gram, a computing system can determine (a) first feature values that indicate the non-occurrence of n-grams having the particular number of words that have corresponding n-gram features in the maximum entropy language model, and (b) a second feature value, for at least one backoff feature, that indicates the occurrence of a language sequence that (i) has the particular number of words and (ii) includes a specific portion of the particular context.

The feature values for the n-gram features and the feature values for the backoff features are input to the maximum entropy language model (408). In response to the feature values, an output is received from the maximum entropy language model in response to the feature values (410). The output is indicative of a likelihood of occurrence of the candidate transcription. For example, the output can represent a likelihood that the candidate transcription will occur given the occurrence of the sequence of words in the particular context.

A transcription for the utterance is selected, from among a plurality of candidate transcriptions, based on the output of the maximum entropy language model (412). In some implementations, an output of the maximum entropy language model is determined for each of multiple candidate transcriptions, in response to inputting different sets of feature values to the model. Each of multiple transcriptions is assigned a score based on an output of the model. Of the candidate transcriptions, the candidate transcription assigned the score indicating the highest likelihood of occurrence can be selected. Other techniques may additionally or alternatively be used. For example, a set of feature scores can be determined for each of multiple paths through a speech recognition lattice. The outputs may be used to score different paths of the lattice, to identify a most likely path. A transcription represented by the most likely path may be selected.

The selected transcription is provided to a client device (414). For example, the transcription may be provided, over a computer network, for display at a mobile computing device. In some instances, the transcription is provided for display in, for example a particular field of a web page or application being displayed at the client device.

Figure 5:
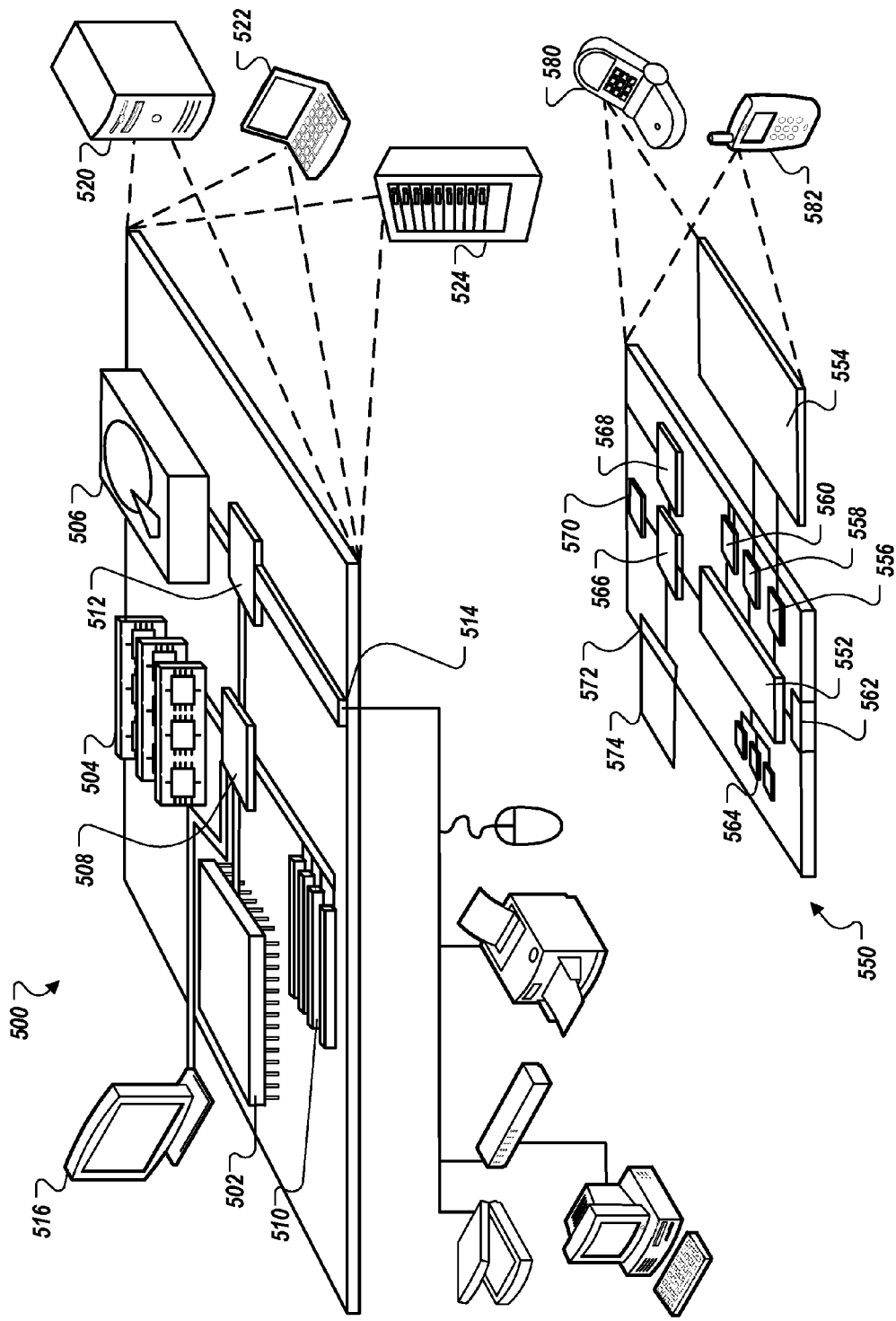
FIG. 5 is a schematic diagram that shows an example of a computing device and a mobile computing device.

FIG. 5 shows an example of a computing device 500 and an example of a mobile computing device 550 that can be used to implement the techniques described above. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or an networking device such as a switch or router, e.g., through an network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, tablet computer, wearable computer, or other similar mobile device.

The techniques discussed above may be used for modeling a variety of conditions and outcomes. For example, backoff features may be used with maximum entropy models for natural language processing, such as language modeling. Similarly backoff features may be used with maximum entropy models for computer vision, object recognition, speaker identification, classification, and other applications to represent the occurrence of unseen or uncommon contexts.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method performed by one or more computers, the method comprising:
    receiving, by the one or more computers, data indicating a candidate transcription for an utterance and a particular context for the utterance;
    obtaining, by the one or more computers, a maximum entropy language model that includes (i) scores for one or more n-gram features that each correspond to a respective n-gram and (ii) scores for one or more backoff features that each correspond to a set of n-grams for which there are no corresponding n-gram features in the maximum entropy language model;
    determining, by the one or more computers, based on the candidate transcription and the particular context, a feature value for (i) each of the one or more n-gram features of the maximum entropy language model and (ii) each of the one or more backoff features of the maximum entropy language model;
    inputting, by the one or more computers, the feature values for the n-gram features and the feature values for the backoff features to the maximum entropy language model; and receiving, by the one or more computers, from the maximum entropy language model, an output indicative of a likelihood of occurrence of the candidate transcription;

selecting, by the one or more computers, based on the output of the maximum entropy language model, a transcription for the utterance from among a plurality of candidate transcriptions; and providing, by the one or more computers, the selected transcription to a client device.

2. The method of claim 1, wherein the maximum entropy language model is a log-linear model.

3. The method of claim 1, wherein the scores of the maximum entropy language model comprise, for each context in a set of different contexts that each comprise a different sequence of one or more words, scores for:

multiple different n-gram features that each correspond to the occurrence of a respective word with the context, and a backoff feature that corresponds to the occurrence of any of multiple words with the context.

4. The method of claim 1, wherein the scores of the maximum entropy language model comprise, for each context in a set of different contexts that each comprise a different sequence of one or more words, scores for:

multiple different n-gram features that each correspond to the occurrence of a respective word with the context, the respective words forming a set of words, and a backoff feature that corresponds to the occurrence, with the context, of any word that is not in the set of words.

5. The method of claim 4, wherein the multiple different n-gram features for a context each correspond to the occurrence of a respective word after the one or more words of the context, and the backoff feature for the context corresponds to the occurrence of any of multiple words after the one or more words of the context.

6. The method of claim 1, wherein the scores of the maximum entropy language model comprise, for each context in a set of different contexts that each comprise a different sequence of one or more words, respective scores for:

multiple different n-gram features that each correspond to a respective language sequence that includes the one or more words of the context, each of the respective language sequences being formed of a same, particular number of words, and one or more backoff features that each correspond to a set of multiple language sequences, wherein, for each backoff feature, each language sequence in the set of language sequences (i) is formed of the particular number of words, (ii) comprises a particular subset of the one or more words of the context, and (iii) omits a particular sub-sequence of words within the context.

7. The method of claim 6, wherein the one or more backoff features for a context comprise multiple backoff features that correspond to different sets of language sequences that include different portions of the context.

8. The method of claim 1, wherein generating the feature values for the one or more backoff features based on the particular context comprises generating at least one feature value that indicates that at least a portion of the particular context does not correspond to any of the n-gram features.

9. The method of claim 1, wherein determining the feature values comprises:

identifying a particular n-gram that includes words of the candidate transcription immediately following a sequence of words indicated by the particular context, the n-gram of words being formed of a particular number of words;

determining that that the maximum entropy language model does not have an n-gram feature corresponding to the particular n-gram;

in response to determining that the maximum entropy language model does not have an n-gram feature corresponding to the particular n-gram:

determining first feature values that indicate the non-occurrence of n-grams having the particular number of words that have corresponding n-gram features in the maximum entropy language model;

determining, for at least one backoff feature, a second feature value that indicates the occurrence of a language sequence that (i) has the particular number of words and (ii) includes a specific portion of the particular context.

10. The method of claim 9, wherein determining the feature values comprises determining multiple second feature values that each indicate the occurrence of an n-gram having the particular number of words, the multiple second feature values corresponding to different backoff features and indicating that different portions of the particular context occurred within an n-gram having the particular number of words.

11. The method of claim 1, wherein the feature values for the n-gram features indicate whether a particular n-gram comprising the candidate transcription and the particular context matches n-grams associated with the respective n-gram features, and wherein the feature values for the backoff features indicate whether the portions of the particular n-gram are different from the n-grams associated with the respective n-gram features.

12. The method of claim 1, wherein at least one of the feature values for the backoff features indicates that a portion of the particular context having particular size is different from the each of the contexts of the particular size that are associated with the n-gram features.

13. The method of claim 1, wherein each of the feature values is a binary value.

14. The method of claim 1, wherein scores for at least some of the backoff features of the maximum entropy language model indicate a non-zero probability of occurrence of sets of n-grams represented by the backoff features, and wherein the maximum entropy language model is normalized.

15. A system comprising:

one or more computers and one or more storage devices storing instructions that are operable, when executed by the one or more computers, to cause the one or more computers to perform operations comprising:

receiving, by the one or more computers, data indicating a candidate transcription for an utterance and a particular context for the utterance;

obtaining, by the one or more computers, a maximum entropy language model that includes (i) scores for one or more n-gram features that each correspond to a respective n-gram and (ii) scores for one or more backoff features that each correspond to a set of n-grams for which there are no corresponding n-gram features in the maximum entropy language model;

determining, by the one or more computers, based on the candidate transcription and the particular context, a feature value for (i) each of the one or more n-gram features of the maximum entropy language model and (ii) each of the one or more backoff features of the maximum entropy language model;

inputting, by the one or more computers, the feature values for the n-gram features and the feature values for the backoff features to the maximum entropy language model; and receiving, by the one or more computers, from the maximum entropy language model, an output indicative of a likelihood of occurrence of the candidate transcription;

selecting, by the one or more computers, based on the output of the maximum entropy language model, a transcription for the utterance from among a plurality of candidate transcriptions; and providing, by the one or more computers, the selected transcription to a client device.

16. The system of claim 15, wherein the maximum entropy language model is a log-linear model.

17. The system of claim 15, wherein the scores of the maximum entropy language model comprise, for each context in a set of different contexts that each comprise a different sequence of one or more words, scores for:

multiple different n-gram features that each correspond to the occurrence of a respective word with the context, and a backoff feature that corresponds to the occurrence of any of multiple words with the context.

18. A non-transitory computer-readable data storage device storing a computer program, the program comprising instructions that when executed by one or more computers cause the one or more computers to perform operations comprising:

receiving, by the one or more computers, data indicating a candidate transcription for an utterance and a particular context for the utterance;

obtaining, by the one or more computers, a maximum entropy language model that includes (i) scores for one or more n-gram features that each correspond to a respective n-gram and (ii) scores for one or more backoff features that each correspond to a set of n-grams for which there are no corresponding n-gram features in the maximum entropy language model;

determining, by the one or more computers, based on the candidate transcription and the particular context, a feature value for (i) each of the one or more n-gram features of the maximum entropy language model and (ii) each of the one or more backoff features of the maximum entropy language model;

inputting, by the one or more computers, the feature values for the n-gram features and the feature values for the backoff features to the maximum entropy language model; and receiving, by the one or more computers, from the maximum entropy language model, an output indicative of a likelihood of occurrence of the candidate transcription;

selecting, by the one or more computers, based on the output of the maximum entropy language model, a transcription for the utterance from among a plurality of candidate transcriptions; and providing, by the one or more computers, the selected transcription to a client device.

19. The non-transitory computer-readable data storage device of claim 18, wherein the maximum entropy language model is a log-linear model.

20. The non-transitory computer-readable data storage device of claim 18, wherein the scores of the maximum entropy language model comprise, for each context in a set of different contexts that each comprise a different sequence of one or more words, scores for:

multiple different n-gram features that each correspond to the occurrence of a respective word with the context, and a backoff feature that corresponds to the occurrence of any of multiple words with the context.

* * * * *